United States Patent [19]
Abraham

[11] Patent Number: 5,559,377
[45] Date of Patent: Sep. 24, 1996

[54] TRANSFORMER COUPLER FOR COMMUNICATION OVER VARIOUS LINES

[76] Inventor: Charles Abraham, 1434 Sugartown Rd., Berwyn, Pa. 19312

[21] Appl. No.: 270,002

[22] Filed: Jul. 1, 1994

Related U.S. Application Data

[63] Continuation-in-part of Ser. No. 822,329, Jan. 17, 1992, abandoned, which is a continuation of Ser. No. 515,578, Apr. 26, 1990, abandoned, which is a continuation-in-part of Ser. No. 429,208, Oct. 30, 1989, abandoned, which is a continuation-in-part of Ser. No. 344,907, Apr. 28, 1989, abandoned.

[51] Int. Cl.$^6$ .................................................. H01F 27/42
[52] U.S. Cl. ..................... 307/104; 330/149; 343/850; 343/867; 340/310.07; 455/280; 359/161
[58] Field of Search ........................ 307/104; 330/149; 359/161; 343/867, 850; 455/280; 340/310.07

[56] References Cited

U.S. PATENT DOCUMENTS

| | | | |
|---|---|---|---|
| 4,449,128 | 5/1984 | Weir | 343/858 |
| 4,525,650 | 6/1985 | Hicks et al. | 315/226 |
| 5,191,338 | 3/1993 | Katz et al. | 342/352 |

*Primary Examiner*—William M. Shoop, Jr.
*Assistant Examiner*—Albert W. Paladini
*Attorney, Agent, or Firm*—Famiglio & Massinger

[57] ABSTRACT

Apparatus for electrical line communication that includes a coupler at each of two or more locations along a pair of lines, the coupler having capacitive circuits serially connected with an air-core transformer. The capacitive circuit is designed to resonate with the air-core transformer at a preselected frequency. A transmitter, receiver and modem may also be provided at each location. The apparatus incorporates a novel phase linear coupler which eliminates noise and is matched resistively to the characteristic impedance of the line at a preselected frequency. This apparatus therefore linearizes communication on the line and allows high speed data and voice communication over long distances.

10 Claims, 35 Drawing Sheets

PRIOR ART

PRIOR ART

POWER LINE SPREAD SPECTRUM TRANSMITTER

POWER LINE SPREAD SPECTRUM RECEIVER

TRANSFORMER COUPLER FOR COMMUNICATION OVER VARIOUS LINES

This application is a continuation-in-part of U.S. Ser. No. 07/822,329, filed Jan. 17, 1992 (now abandoned), which is a continuation of U.S. Ser. No. 07/515,578, filed Apr. 26, 1990 (now abandoned), which is a continuation-in-part of U.S. Ser. No. 07/429,208, filed Oct. 30, 1989 (now abandoned), which is a continuation-in-part of U.S. Ser. No. 07/344,907, filed Apr. 28, 1989 (now abandoned).

FIELD OF THE INVENTION

The present invention is related generally to power system communications, and more particularly to apparatus capable of simultaneously transmitting and receiving digital data signals both at high rates and over long distances through power-lines and through power line transformers, including AC, DC and coaxial cables (including phone lines).

BACKGROUND OF THE INVENTION

"Power-line carriers" are well known in the field of power system communications. The principal elements of such power-line carriers are transmitting and receiving terminals, which include one or more line traps, one or more coupling capacitors, as well as tuning and coupling equipment. Detailed information regarding the description and typical composition of conventional power line carriers may be found in Fundamentals Handbook of Electrical and Computer Engineering, Volume II: Communication, Control, Devices, and Systems, John Wiley & Sons, 1983, pp 617–627, the contents of which are incorporated herein by reference.

A significant problem associated with prior art power-line carriers is their requirement for one or more line traps, one or more capacitors, one or more coupling transformers or one or more carrier frequency hybrid circuits and frequency connection cables. The new power-line carrier system presents a solution to the fundamental problem of matching the electrical line characteristic impedance with the line coupler. The novel signal coupler design is easily adaptable for operation on distribution and low voltage lines.

All traditional couplers incorporate a ferrite or iron core transformer which causes signal distortion due to the non-linear phase characteristic of the transfer function between the transmit coupler and the receive coupler. The distortion is created by the presence of magnetic core material which exhibits hysteresis. For distribution power-line carriers, the distortion is particularly severe because the signal must propagate through three such non-linear devices, the distribution transformer and two power-line couplers, that use ferrite core transformers. The distortion leads to envelope delay distortion which limits communication speeds.

A line with characteristic impedance Zo is ideally matched by terminations equal to Zo at both ends. Since Zo is primarily resistive at the frequencies of interest, the input impedance of the couplers should also be primarily resistive and equal to Zo at the carrier frequencies. A general configuration to achieve this is shown in FIG. 4. It uses a serially connected equivalent capacitor, $C_{eq}$, on the primary of a transformer. The design is based on two principles. First, the resonance between the coupling capacitor, $C_{eq}$ and the primary winding inductance, Li, provides a low resistive impedance at the desired transmit carrier frequency. Second, $C_{eq}$ has a large enough impedance at 60 Hz to block the line frequency. Note that this approach is not new, however, previous efforts at achieving satisfactory impedance matching encountered problems discussed below.

The major shortcoming of previous designs resulted from the use of ferrite or iron core transformers in the signal couplers. The inductance, L1, is altered to some unknown value due to the non-linearity of the core. This results in a mistuning of the desired carrier frequency. Also, the impedance of the primary winding at the desired carrier frequency is no longer purely resistive. This may lead to a mismatch with respect to the line characteristic impedance. In recognition of this fact, other designs (FIGS. 1, 2) attempt to merely couple the signal onto the power line with a low transceiver input impedance by using a large coupling capacitor (approx. 0.5 uF). This results in a significant coupling loss of up to 20 dB at carrier frequency.

The present invention, characterized in FIG. 4, has two coaxial solenoids or air-coils of different diameter with primary and secondary inductances L1 and L2 respectively. Both L1 and L2 are inductively and capacitively coupled creating an air-core transformer (see FIG. 9A). The air-gap is filled with resin which insulates the AC current from the transceiver. The size of the gap is selected to reduce inductive loading effects from coupler secondary to the primary. Since the coupling capacitor, Ceq, is significantly larger than the static capacitor, Cs the static capacitor (FIG. 20) does not mistune the desired carrier frequency. Inductive loading effects from the secondary to primary of the air-core transformer are minimized at the transmit frequency. The effective transceiver input independence, as seen at the primary, is equal to the resistance of the primary winding ($R_t$ or $R_r$). This value can be chosen to optimally match the line characteristic independence. When Zo equals the resistance of the primary winding, Rt, of the air-core transformer about 25% of the source power can be coupled into the line through the powerline coupler. Note that Zo varies between 5 and 150 Ohms on distribution lines and 1 and 20 Ohms on 120/240 V network lines depending on loading conditions. Since insertion loss increases rapidly for termination impedances were the primary winding impedance is greater than Zo (as compared to primary winding impedance less than Zo), a prudent design choice is to use a value of primary winding resistance approximately equal to the minimum value of the line characteristic impedance, Zo.

The advantage of an air-core transformer in the novel coupler is exhibited by the frequency response shown in FIG. 5. There is a considerably greater band width around the center frequency when comparing it to the response of a traditional coupler which uses a magnetic-core transformer (FIG. 3).

A significant reduction of 60 Hz harmonics are observed at the secondary side of the novel coupler. This reduction can exceed 20 dB over a wide band. Most noise generated on power lines by AC motors and equipment has a large reactive source impedance. This type of noise experiences significant loss through the novel couplers due to the coupler's low resistive impedance at or around the carrier frequency of the transmission or reception. In contrast, the transfer characteristic of ferrite or iron core couplers typically has a high Q (FIG. 3), which is advantageous in theory for reducing the effects of the harmonics outside the bandwidth, but in actuality constrains the useful transmission bandwidth of the power-line carrier and does not provide noise attenuation inside the bandwidth. The wide bandwidth noise rejection of the novel coupler obviates the need for a sinx/x type receive filter for harmonic rejection. This implies that no separate receiver is required, other than the coupler, for high speed transmission.

Another significant aspect of the design is the phase linearity achieved. The matching of the line impedance and the use of air-core transformers are responsible for the amount of phase linearity achieved. In fact, the phase response of the overall transmission system is linear over a very wide range of frequencies. This implies that almost any desired frequency range can be selected for communication. Also, standing waves are virtually suppressed due to the low resistive matching at both ends of the line. The peak amplitude of the first reflection is around 40 mV, which is small compared to the transmitted signal amplitude of a few volts. Thus, setting the receiver threshold above 40 mV can eliminate any remaining source errors. There is also an elimination of standing waves on the line. This implies that there are no anti-nodes, places where the magnitude of the standing wave is zero and no transmission can occur, at points on the line situated at odd multiples of lambda/4 away from the end of the line.

The best frequency range 120/240 V power lines is 70–160 KHz (this includes LAN operations). For data transmission through power line transformers the optimal frequency to use is the 25–45 KHz band. For very high speed LAN applications a frequency range of 70–480 KHz is appropriate. Finally, the novel coupler of the present invention is equally applicable to any voltage AC, DC, phone, twisted pair or coaxial line.

In view of the above, it is an object of the present invention to provide a power line communications apparatus which utilizes a novel phase shift linear power, phone, twisted pair, and coaxial line coupler for both transmission and reception.

It is a further object of the present invention to provide power-line communication apparatus utilizing novel air-core transformers which can be used for phone line, coaxial, LAN, and power line communication through power line transformers.

It is an additional object of the present invention to provide a power-line communication apparatus in which the primary coil of the transformer resonates with an associated coupling capacitor network in order to achieve resistive matching to approximately the lowest known value of the line characteristic impedance and to maximize stable signal transmission onto the line. This resonation effectively creates a band pass filter at carrier frequency.

It is still a further object of the present invention to provide a communications apparatus in which an air-core transformer has primary and secondary windings in which the ratio of the windings is about 1:1.

It is still yet a further object of the present invention to provide a communications apparatus in which the receiver coupling contains a capacitor network which impedes the 60 Hz high power signal and its harmonics.

It is still yet a further object of the present invention to provide a communications apparatus in which the capacitor network for both transmission and reception include resistors which divide down the AC voltage evenly. The resistors also serve to protect the system against spiking and lightning.

It is still yet a further object of the present invention to provide a communications apparatus which can provide a high bandwidth for the transmission of communications signals at speeds greater than 9600 baud, and at speeds of greater than 1200 baud directly through power line transformers.

It is yet a further object of the present invention to provide a communications apparatus containing a phase shift linear air-core transformer effectively comprising two or more solenoids each having different diameters and coaxially within one another such that an air-gap is created, which is usually filed with resin, and which reduces inductive loading effects from the coupler secondary to primary by using the capacitance created in the air-core transformer.

It is still yet a further object of the present invention to provide an apparatus for power system communications over long distances. Because of the low resistive matching of the coupler to the line characteristic impedance, it eliminates standing waves, which implies that there are no anti-nodes at points on the line situated at odd multiples of lambda/4, (3 lambda/4 etc.) away from the end of the line from which no transmission can occur. The low resistive matching also enables communication over long distances.

It is still yet an additional object of the present apparatus to provide power line communications in which the aircore in the coupling transformer gives negligible pulse dispersion and allows for a low resistive matching at the coupler which significantly reduces the power line noise at the coupler output over a wide bandwidth establishing a stable amplitude transfer function with linear phase characteristic over the transmission line.

It is yet another object of the present invention to provide an apparatus for power line communications in which the coupling capacitor resonates with the primary side of the air-core transformer.

It is still a further object of the present invention to provide a novel air-core transformer coupled with a coupling capacitor which provides resistive matching to both sides of the power line transformer to establish a phase shift linear system over the power line and which reduces coupling losses through the power line transformer.

SUMMARY OF THE INVENTION

In accordance with the present invention, apparatus for power-line communications is disclosed. The power-line communication apparatus comprises; modulator and demodulator means for modulating or demodulating a carrier signal having a frequency to be transmitted or received over an electrical line; transmitter and receiver means for transmitting or receiving said modulated carrier signal having said frequency to or from a coupler means; and coupler means comprising capacitor means and air-core transformer means which couples the apparatus to an electrical line.

In accordance with a major aspect of the present invention, an air-core transformer comprising primary and secondary windings function (with resonating capacitor networks) as a phase shift linear coupler, which resistively matches the characteristic impedance of the line and reduces noise at bandwidth. Because the windings (which function as solenoids) create a small static capacitance across an air gap, the secondary windings along with the static capacitance function as a high pass filter.

The communications apparatus of the present invention has numerous applications. The most apparent applications are in electricity and gas meter readings, the switching of remote control devices, and data communications between computers over power lines. By way of example, the present invention makes it possible to transmit electricity and gas meter readings over power-lines for large numbers of customers. Such readings can be transmitted at low power, at high data rates, over long distances and directly through power line transformers. In a hypothetical system, such readings could be made by a computer with addressable data using two frequencies. The data would travel between the computer at the electric company and any homes connected to the electric company. It would travel on house 120/240/480 Volt lines, the distribution 13,800/22,000/69,000 Volt lines and through all associated distribution transformers. In addition, public phone systems in trains and internal security systems in homes could be set up over high voltage power-lines using addressable data transmitted through the phone system.

The present invention can be further utilized to control large or small machines in factories or mines. The apparatus of the present invention has been used to transmit data between computers and printers at speeds in excess of 9600 baud. Other applications include data transmission through phone lines, coaxial lines and any high voltage DC power lines.

Other objects, advantages, and novel features of the present invention will become more apparent from the following detailed description thereof, when considered in conjunction with the accompanying drawings wherein;

It is to be understood that both the foregoing general description and the following detailed description are exemplary, but are not restrictive, of the invention.

DETAILED DESCRIPTION OF THE INVENTION

Figure 6:
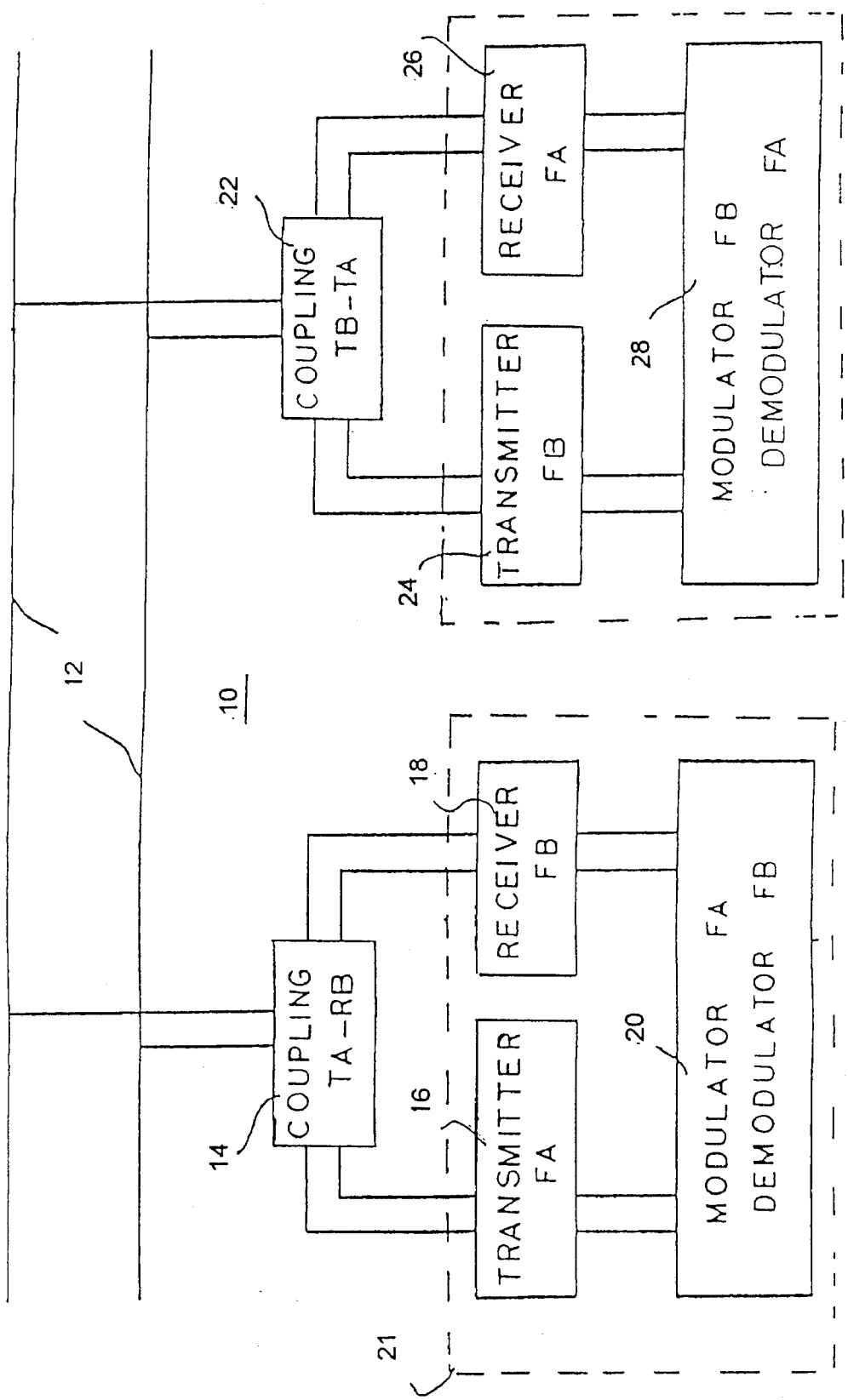
FIG. 6 is a block diagram of a power-line communication apparatus in accordance with the present invention.
Figure 6A:
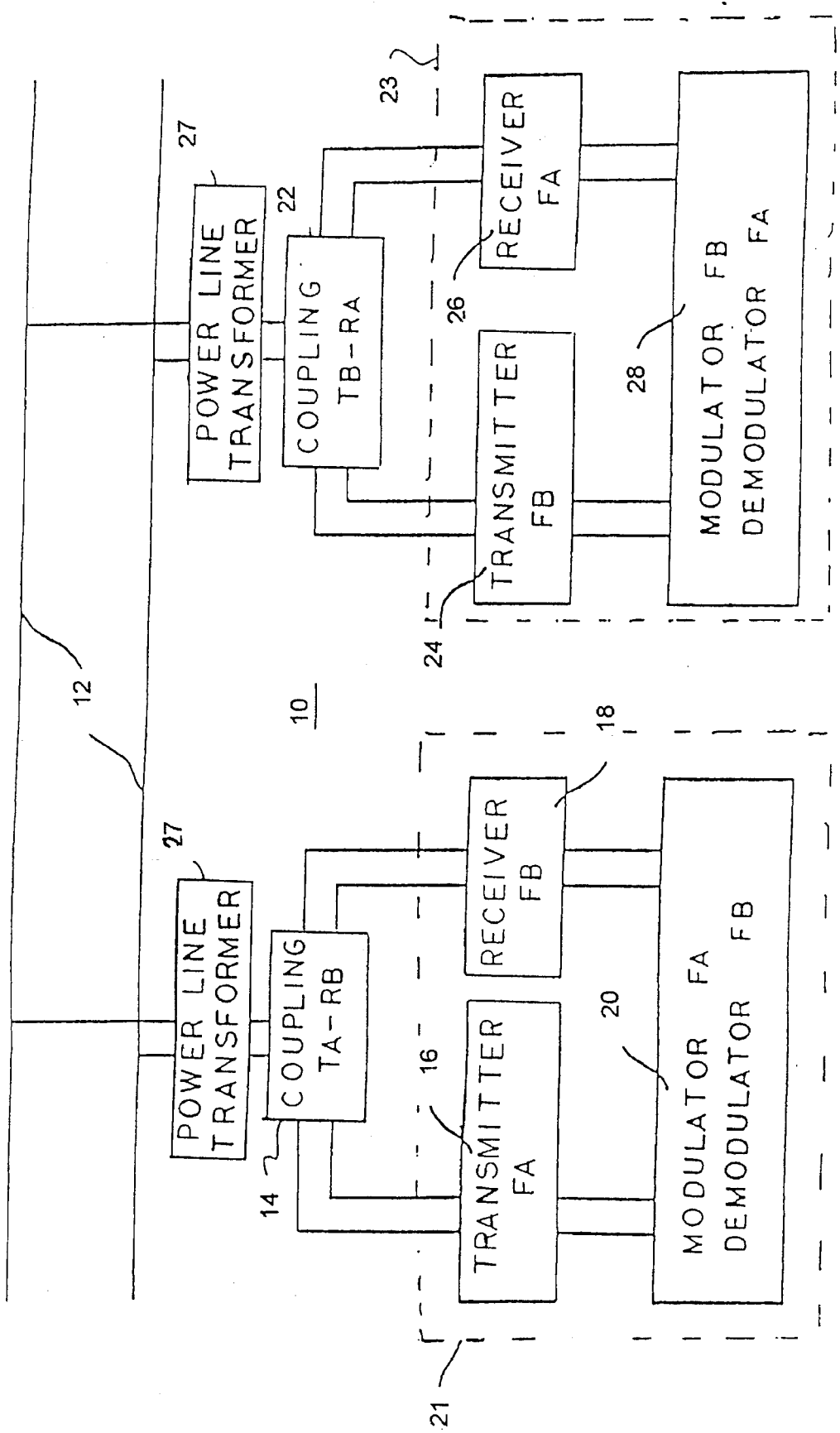
FIG. 6A is a block diagram of a power-line communication apparatus in accordance with the present invention including power-line transformers.

Referring now to the Figures, wherein like numbers designate like or corresponding parts throughout each of the several views, there is shown in FIGS. 6 and 6A block diagrams of a power-line communication apparatus 10 according to the present invention for use in low power applications (up to 480 VAC).

The communications apparatus 10 shown is coupled to a pair of power-lines 12, and generally comprises first coupling means 14, first transmitter means 16, first receiver means 18, and first modulator/demodulator means 20 at a first location along the power-lines 12. The combination of transmitter means 16, receiver means 18 and modulator/demodulator means 20 comprise a first modem means 21. At a second location along power-line 12 are second coupling means 22, second transmitter means 24, second receiver means 26, and second modulator-demodulator means 28. The combination of transmitter means 24, receiver means 26 and modulator/demodulator means 28 comprise a second modem means 23.

Figure 1:
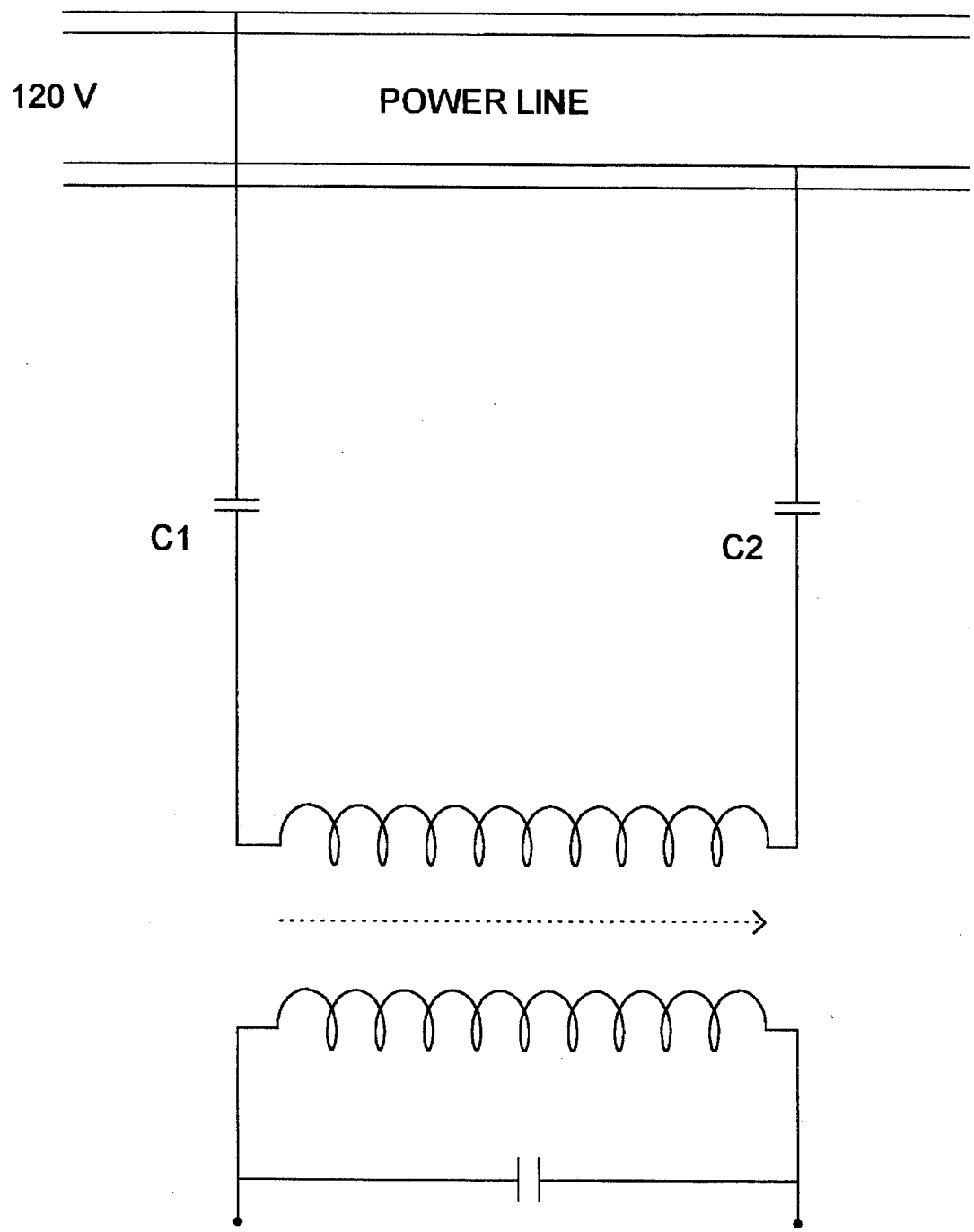
FIGS. 1 and 2 schematically represent traditional duplexing couplers on both low and high voltage power lines.
Figure 2:
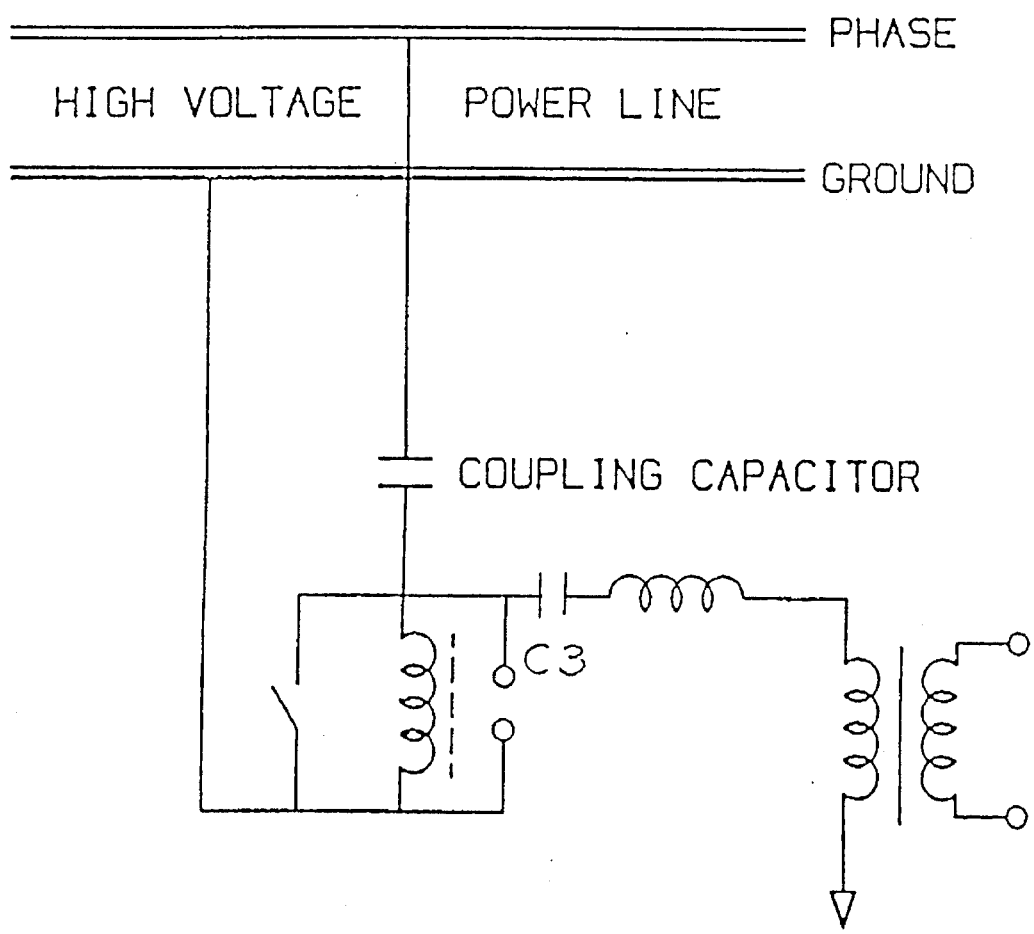
Figure 3:
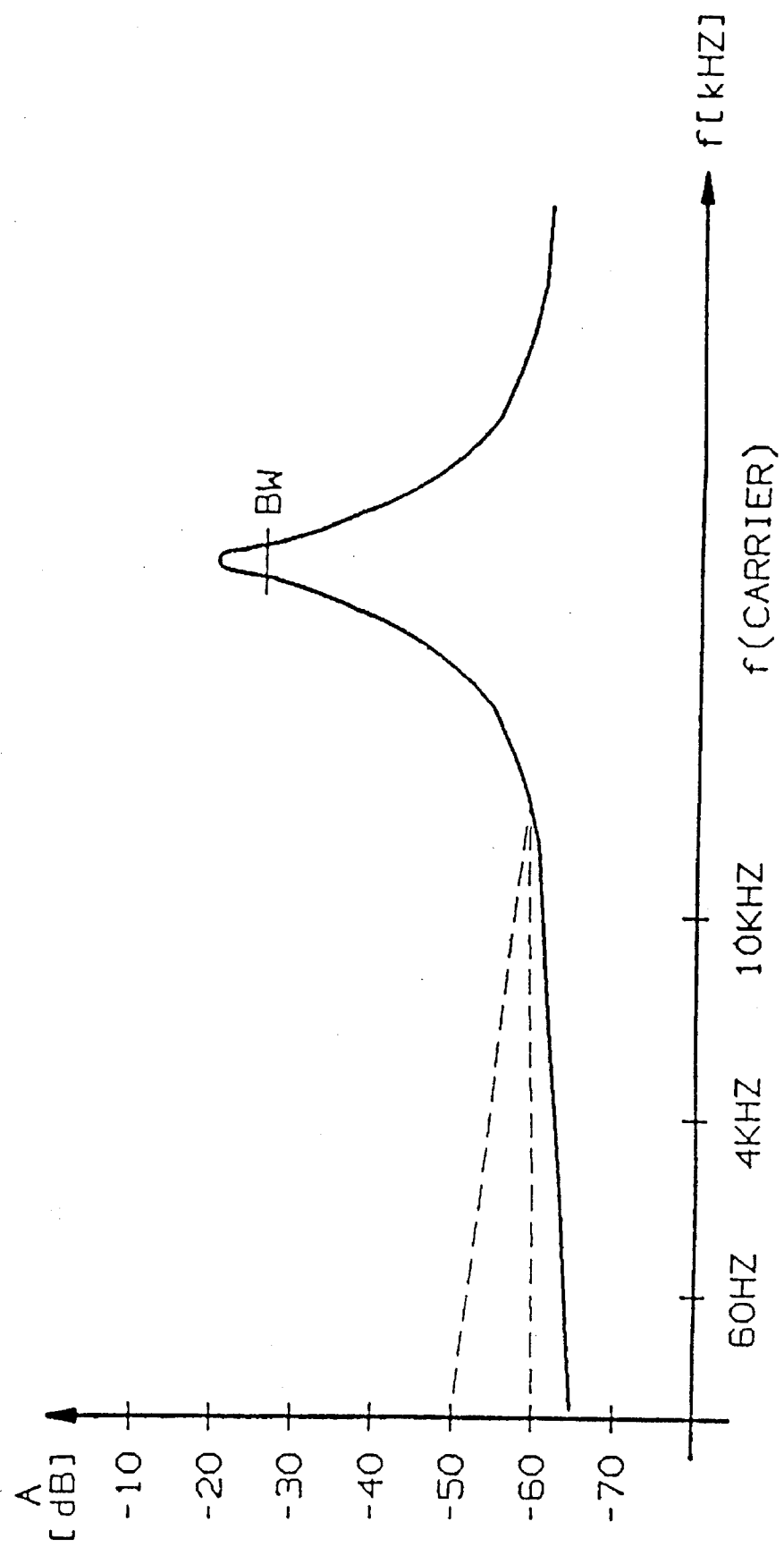
FIG. 3 illustrates the frequency characteristics of traditional serial LC couplers.
Figure 4:
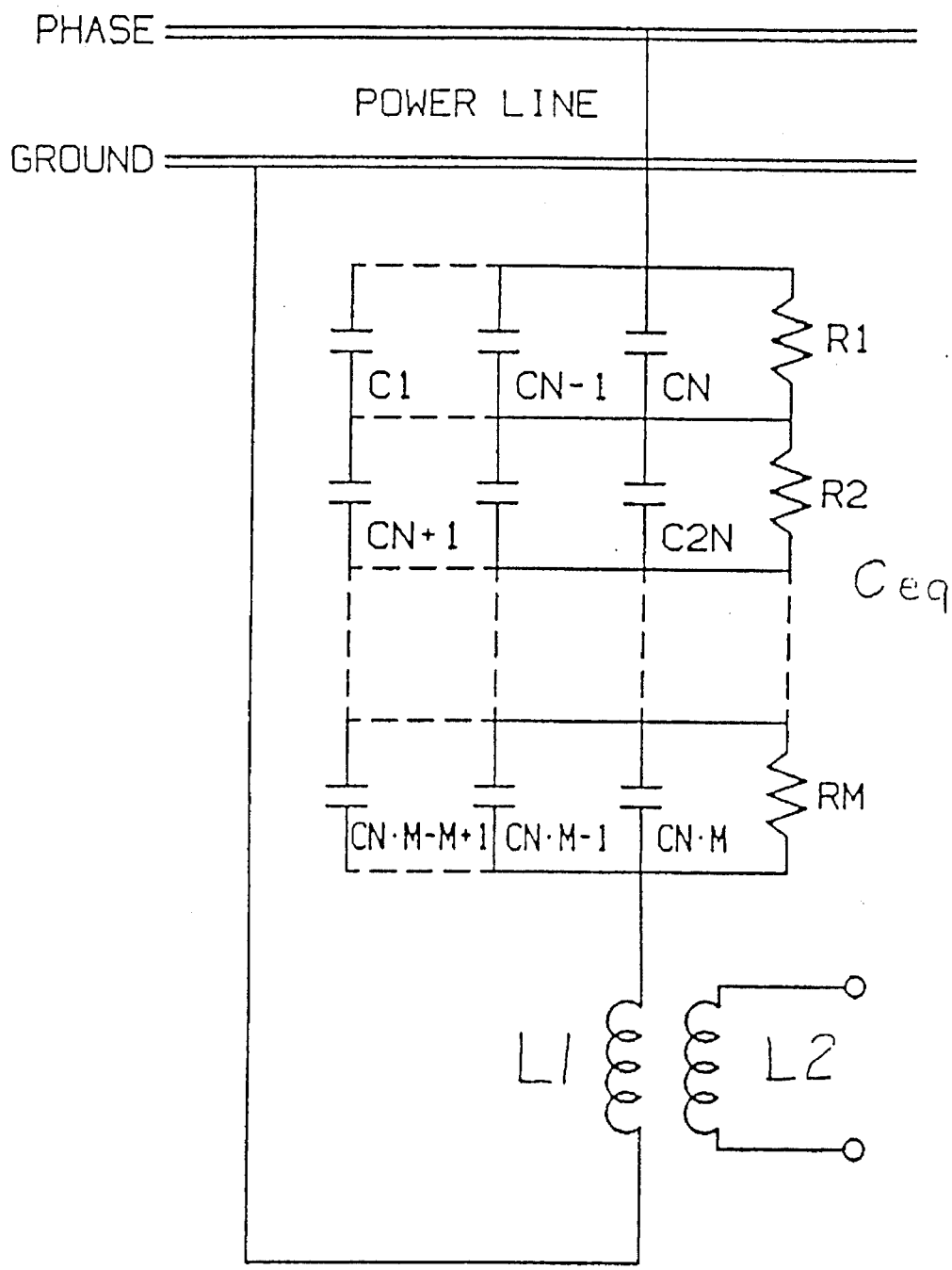
FIG. 4 schematically represents the general circuit diagram of the phase shift linear coupler of the present invention.

As will be explained in greater detail herein below, both coupling means 14, 22 include a pair of serial LC circuits (FIGS. 7 and 8) which are coupled to the pair of power-lines 12. Referring to FIG. 6A, the apparatus is coupled to power-line transformers 27. Each of the serial LC circuits in a respective one of the coupling means 14, 22 resonate at a given frequency. The LC circuits include a plurality of capacitors which are connected in a series and parallel configuration. See FIG. 4. The coupling means 14, 22 further incorporates novel air-core transformers for both transmission and reception which serve as the inductive (L) component of the respective LC circuits. It is to be noted that while the present invention is being described in the context of two identical communications apparatus, either circuit may be configured to function as a simple receiver or transmitter.

The first transmitter means 16, coupled to the first coupling means 14, is capable of transmitting digital data signals carried by a first carrier frequency FA across the pair of power-lines 12, and as shown in FIG. 6A, through power line transformers. The first receiver means 18, coupled to the first coupling means 14, is capable of receiving digital data signals carried by a second carrier frequency FB from the pair of powerlines 12. The modulator/demodulator means 20, coupled between the first transmitter means 16 and the first receiver means 18, modulates the digital data signals to be carried by the first carrier frequency FA, and demodulates the digital data signals carried by the second carrier frequency FB.

In a similar manner, at the second location along the powerlines 12, the second transmitter means 24 is coupled to the second coupling means 22. Second transmitter means 24 is capable of transmitting the digital data signals to be carried by the second carrier frequency FB across the pair of power-lines 12, and as shown in FIG. 6A through power-line transformers. Accordingly, the second receiver means 26 is coupled to said second coupling means 22, and is capable of receiving the digital data signals carried by the first carrier frequency FA from the pair of power-lines 12. The second modulator/demodulator 28, coupled between the second transmitter means 24 and the second receiver means 26, modulates the digital data signals to be carried by the second carrier frequency FB and demodulates the digital data signals carried by the first carrier frequency FA.

The first and second carrier frequencies FA, FB preferably comprise frequencies up to 11 MHz. For most high voltage, long distance communications, the first and second carrier frequencies FA, FB will typically comprise frequencies that are less than about 160 KHz, having bandwidths of less than 20 KHz. When used for communication through power line transformers, FA and FB will typically comprise frequencies below 90 KHz (preferably 25–45 KHz) with bandwidth of about 6 KHz. The serial LC circuits (FIGS. 7 and 8) of both coupling means 14, 22 each comprise resistive matching means which will be described in greater detail below.

Figure 7:
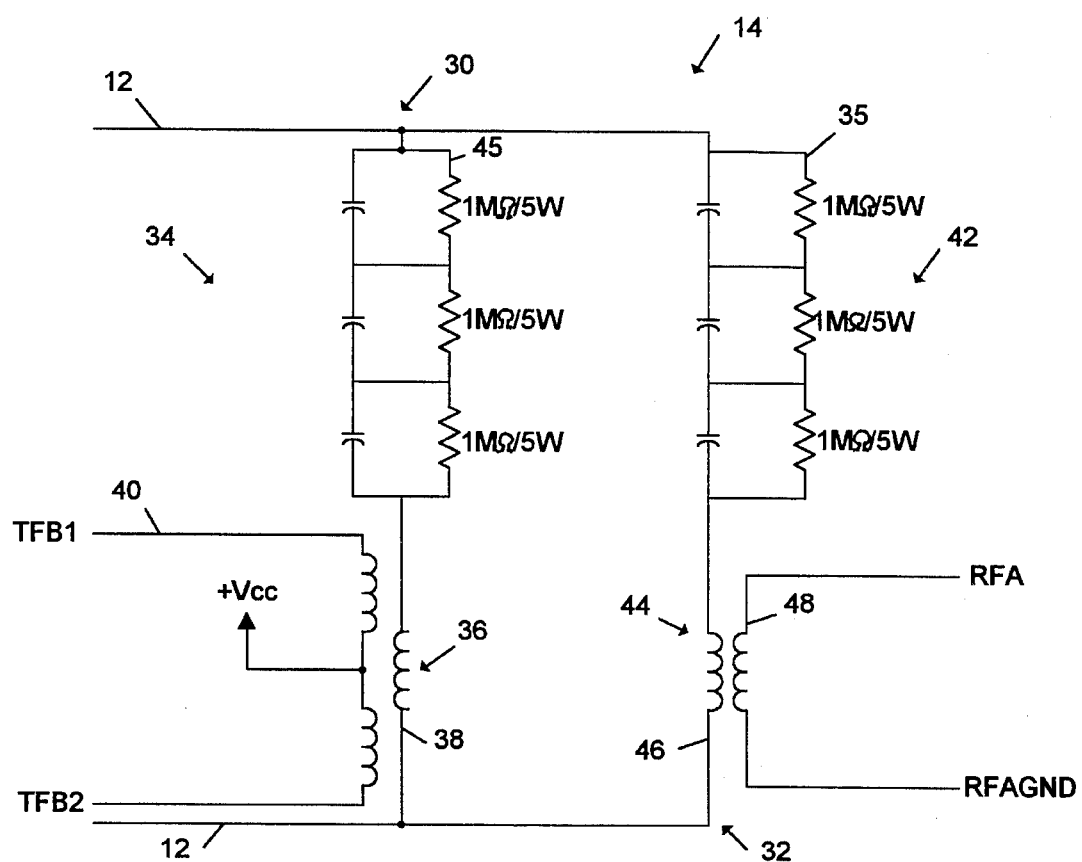
FIG. 7 is a schematic diagram of first coupling means in accordance with the present invention, which corresponds to the coupling TA-RB shown in FIGS. 6 and 6A.
Figure 8:
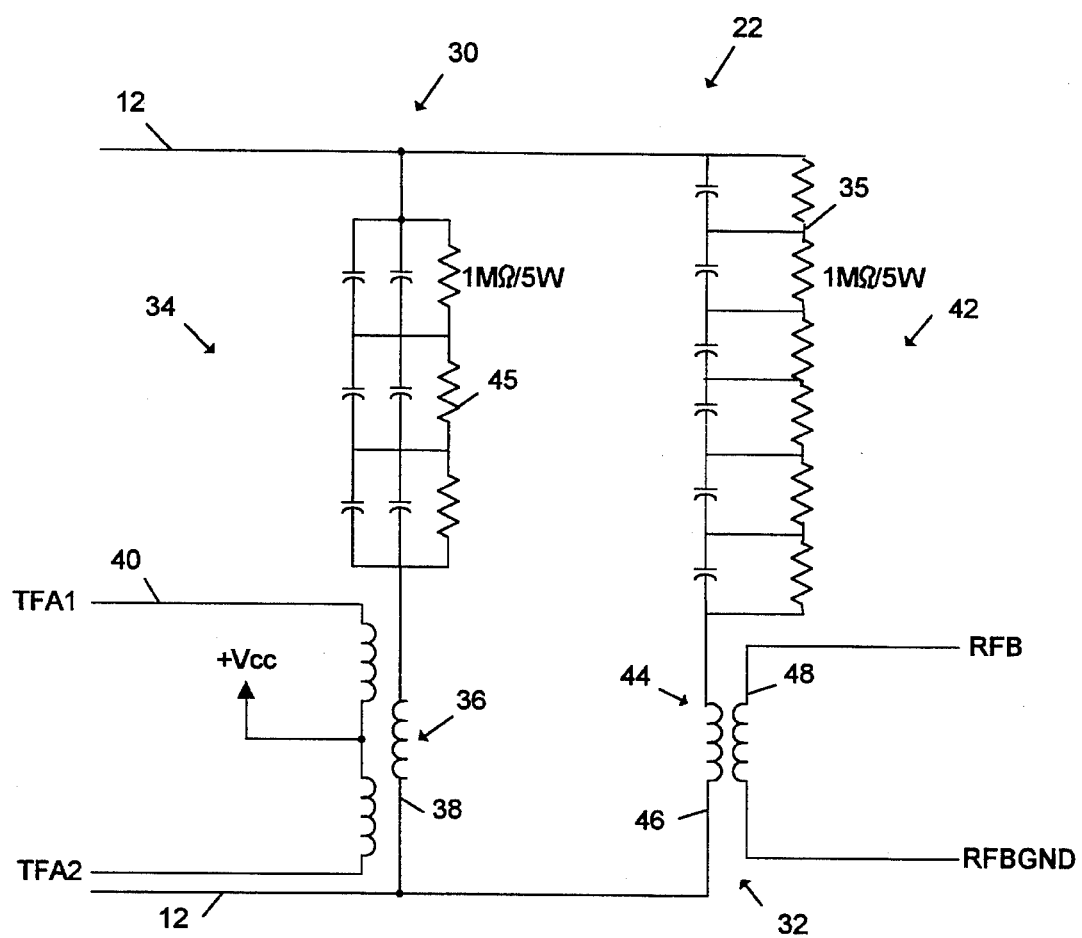
FIG. 8 is a schematic diagram of second coupling means in accordance with the present invention, which corresponds to the coupling TB-RA shown in FIGS. 6 and 6A.

With reference next to FIGS. 7 and 8, the specific circuitry for representative coupling means 14, 22 is now described in greater detail. The coupling means 14 (FIG. 7), 22 (FIG. 8) each include a pair of serial LC circuits 30, 32 which resonate at the carrier frequencies FA, FB. It will be appreciated by those skilled in the art that for FSK (Frequency Shift Key) applications FA will correspond to $F_1$ and $F_2$ and FB will correspond to $F_3$ and $F_4$. The serial LC circuit 30 shown in FIG. 7 resonates at the second carrier frequency FB, while serial LC circuit 32 resonates at the first carrier frequency FA. Similarly, the serial LC circuit 30 of FIG. 8 resonates at the first carrier frequency FA, and serial LC circuit 32 resonates at the first carrier frequency FB.

The LC circuits include respective serially and parallely connected capacitor networks 34, 42. To each capacitor in series is connected a resistor 35 and 45 which evenly divides down the AC voltage. Preferably, the resistor values should be rated at 1 Megaohm per 5 watts and the capacitors should be 200 VAC capacitors. The resistors should preferably be thick film (i.e. carbonless). The Q point of the capacitors should similarly be high. In operation, the couplers (LC) should be placed into a resin for good insulation when used with operating voltages up to 660 V. At operating voltages above 660 v, the capacitors should be separately placed in an oil filled insulator and the air coil transformer placed into a resin. The use of the resistors 35, 45 serve to minimize the DC current so as to prevent spiking and afford lightning protection.

It is to be appreciated that the capacitor networks 34, 42 create equivalent capacitances $C_{eq1}$ and $C_{eq2}$ for transmission and reception, respectively. The capacitor networks are connected to air-core transformers to be discussed below which function as the inductive element (L) of the LC circuit. $C_{eq1}$ and $C_{eq2}$ resonate with the primary windings of the air-core transformers.

The air coil means comprise a first air coil 36 which includes a primary winding 38 and a smaller secondary, winding 40 situated coaxially within the primary winding. The second serial LC circuit 32 includes second air coil 44 including a primary winding 46 and smaller secondary winding 48 situated coaxially within the primary winding.

The first plurality of capacitors 34 are connected together in series between one of the power-lines 12 and the primary winding 38 of the first air coil 36. The primary winding 38 of the first air coil 36 is thereafter serially connected to the other power line 12. The secondary winding 40 of the first air coil 36 is connected to its respective transmitter means 16. The second plurality of capacitors 42 are serially connected together between one of power lines 12 and the primary winding 46 of the second air coil 44. The primary winding 46 of the second air coil 44 thereafter being serially connected to the other power line 12. As noted above resistors, 35 and 45 function to evenly divide the voltage and serve to minimize spiking and afford lightning protection.

Figure 9A:
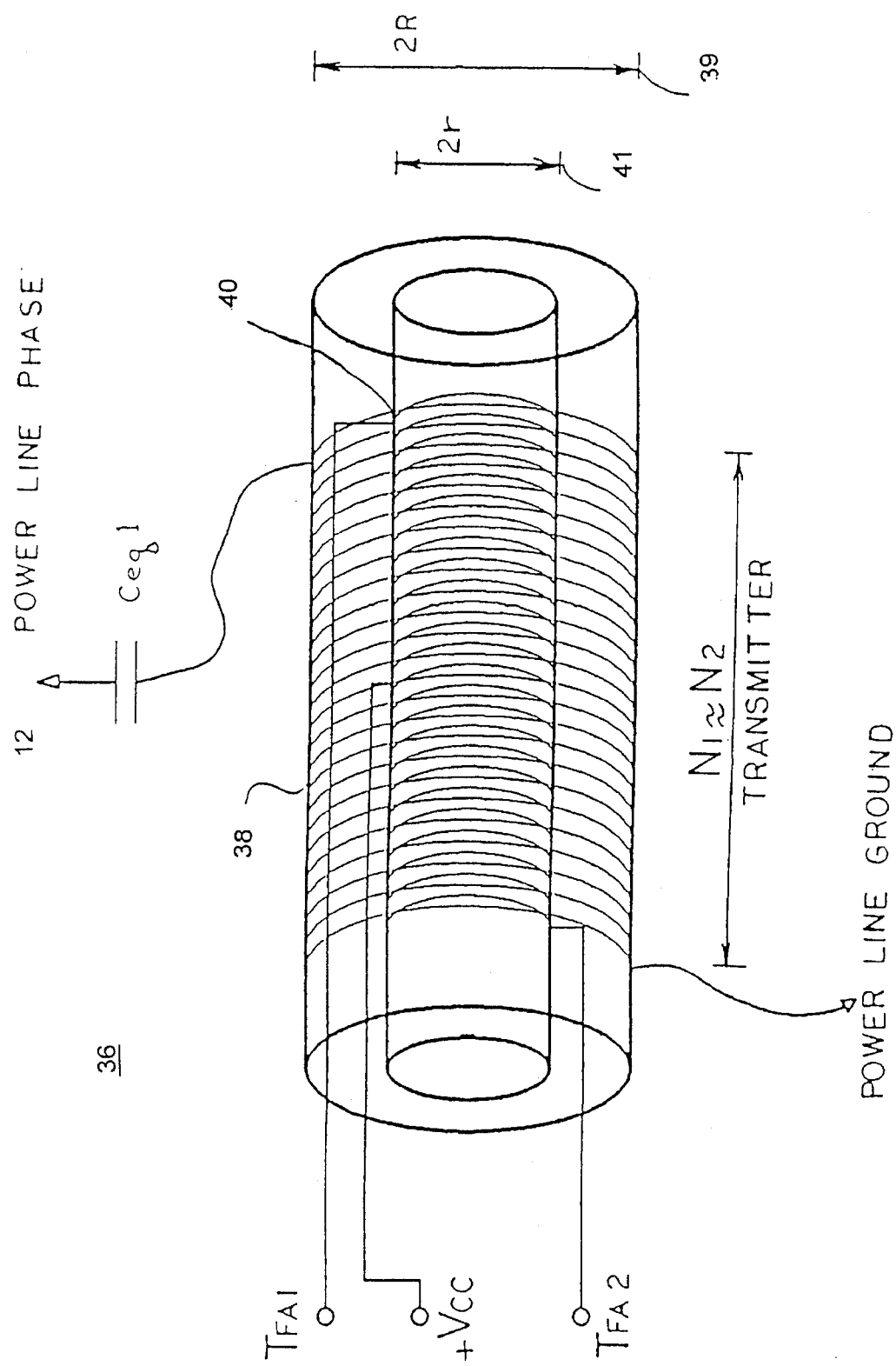
FIGS. 9A and 9B illustrate the coaxially extended air-core transformer with coupling capacitor utilized in the present invention.
Figure 9B:
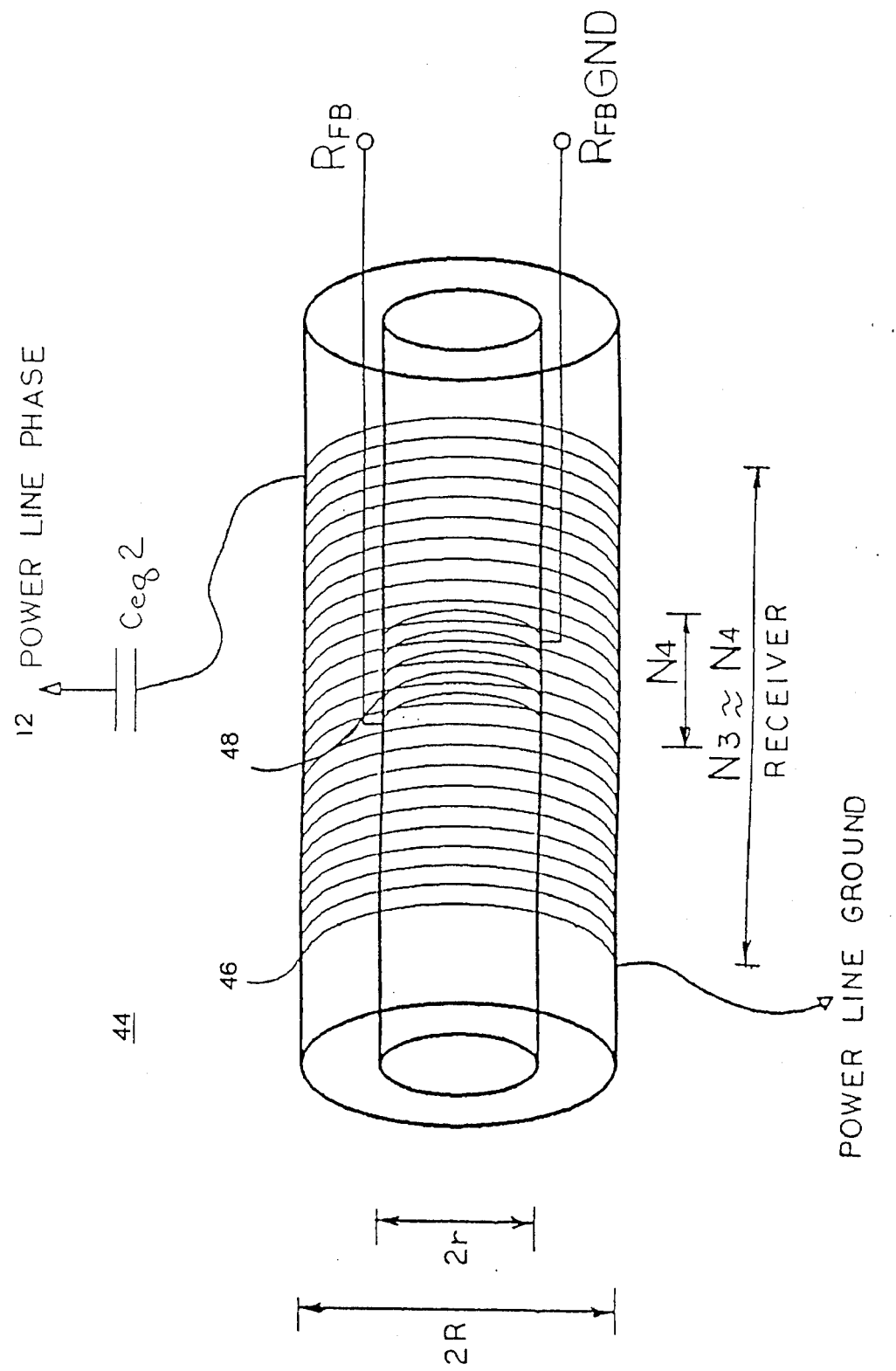
Figure 9C:
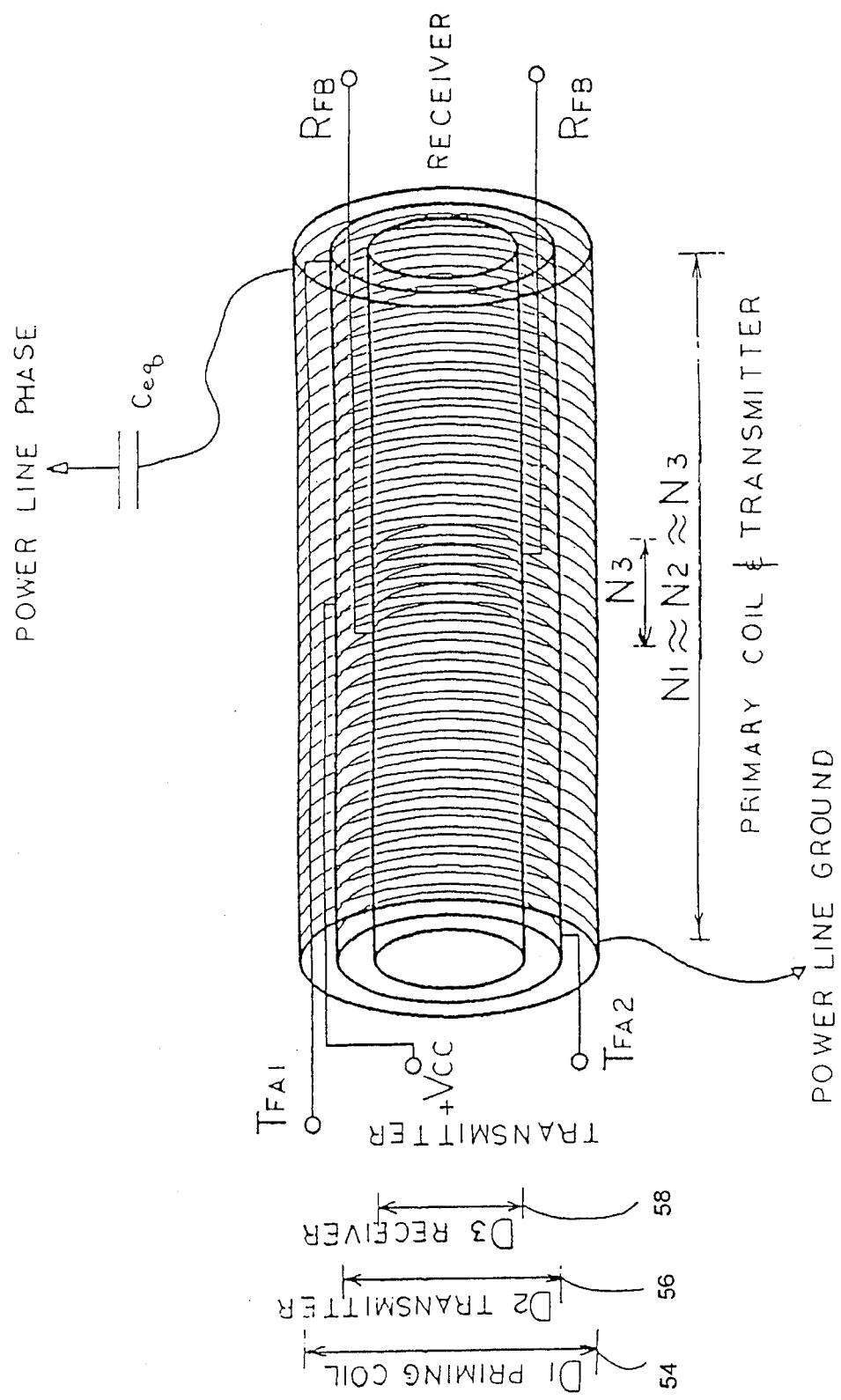
FIG. 9C illustrates a half duplexing coupler in accordance with the present invention for data communications through distribution transformers.

Referring to FIGS. 9A–9C, the phase shift linear air-core transformers of the present invention are described in greater detail.

The phase shift linear transformer of the present invention involves a dielectric core coupler which uses a dielectric material disposed between the primary and secondary windings. A dielectric is a material which is an electric insulator or in which an electric field can be sustained with a minimum dissipation in power. Examples of other dielectric materials include plastic, paper, wood, resin compounds, glue based compounds, as well as other materials understood by those skilled in the art to be dielectric and suitable for the core of a transformer as described herein. A dielectric is used to insure that the AC voltages are not transferred from the primary winding to the secondary winding. Even the several hundred kilovolts which can be contained in a lightening strike which may hit the primary, would be insulated from the secondary by the use of a dielectric material such as a resin.

In a preferred embodiment, an epoxy core is used. The epoxy core of this embodiment is made up of a resin and an activator. It is desirable to minimize the shrinkage of the resin. For this reason, a medium shrinkage resin such as that contained in EP5342 of Eager Plastics Company, Chicago, Ill. can be used. Other suitable resins and activators (epoxies) will be understood by those skilled in the art. Multiple pours of the epoxy as well as fillers (such as slate, flour or sand) can be used to minimize shrinkage and the exothermic heat it generates.

In another embodiment of the phase shift linear transformer of the present invention, an air-core coupler is used. The air-core coupler of this embodiment is constructed by wrapping the secondary and primary windings around plastic tubes having a hollow section. The tube with the secondary winding is fitted within the tube wrapped with the primary winding. Where air-coil couplers or structures are referred to throughout the specification, dielectric core, couplers or structures, such as resin core couplers, can be used interchangeably.

The tube of the phase shift linear transformer over which the primary winding is wound and within which the dielectric material is filled, can be made of a plastic or similar dielectric material as recited above. In addition, the tube/dielectric material combination can be a single piece forming a solid bar of dielectric material such as a medium-shrinkage resin. The secondary winding is then wrapped around this dielectric bar and then the dielectric bar with the secondary winding is enveloped in a casing of a dielectric material such as the low-shrinkage resin over which the secondary is wound or another dielectric material such as a plastic. The primary winding is then wound around the secondary dielectric material encasing the secondary winding.

Both the primary and secondary windings in a preferred embodiment are wound very tightly, so that the insulation from one wire abuts the insulation of an adjacent wire. Therefore, the distance between adjacent wires is the thickness of the insulation on each adjacent wire.

The particular gauge wire as well as the diameter of the overall winding, depends upon the frequency for which the particular phase shift linear transformer is being designed. Example wire can be between 20 and 36 gauge for the many applications although higher or lower gauge wires can be used depending upon the particular application. Further, the primary and secondary windings may have different gauge wires used again to tune the device to the particular frequency for a specific application. It is also possible for a particular application that the primary and the secondary would use the exact same wire for their windings. Examples of wires which can be used for the primary or secondary winding are copper/magnet wires such as Belden Heavy Armored Poly-Thermaleze and Single Beldsol® Solderable wires of Belden Wire and Cable. Other wires suitable for the primary and secondary windings will be understood by those skilled in the art.

In a preferred embodiment, both the primary and secondary are single layer windings, not multiple layer windings. Also, in a preferred embodiment, both the primary and secondary windings are adhered to the resin or resin tube. One method for adhering the wire to the dielectric tube or dielectric bar is through the use of a glue.

The novel air coil structures function as respective inductively and capacitively coupled air-core transformers for both transmission and reception. FIG. 9A illustrates the transmitter transformer 36 with coupling capacitor network $C_{eq1}$. As shown in FIG. 9A, the transmitter transformer 36 is connected in series with $C_{eq1}$ and the power line 12. The transformer is phase shift linear and comprises a primary winding 38 and coaxial smaller secondary winding 40 which is placed between the primary winding. The primary winding 38 has a winding diameter 2R 39 which is greater than the diameter of the secondary winding 2r 41 and accordingly creates an air gap between the two. Of particular significance is the fact that both the primary and secondary windings 38, 40 in the transmitter air coils have the same number of turns (designated by N1=N2), and are thus at a 1:1 ratio. Accordingly, the transmitter doesn't require a high transmission voltage, as is characterized by prior art devices. Further $C_{eq1}$ is set to resonate with the primary winding at the carrier frequency FA, thus creating a band pass filter at the carrier frequency FA. This maximizes the current at the carrier frequency FA.

The values of $C_{eq1}$ and the resistors, 35, 45 are set to generate a large voltage loss at frequencies less that 10 KHz (thus encompassing the 60 Hz and its harmonics). Thus, the significantly reduced 60 Hz signal cannot generate a large enough current to pass the static capacitance. That is, for transmission, the resistivity of the primary coil is roughly equal to the lowest known value of the characteristic impedance of the power line.

The receiver transformer is now described with respect to FIG. 9B. The receiver is connected to the power line 12 via $C_{eq2}$. As with the transmitter of FIG. 9A, the receiver air coil comprises a phase shift linear transformer having a primary winding 46 with a first diameter 2R 47 and a secondary coaxial winding 48 having a second diameter 2r 49. Accordingly, an air gap, and thus a static capacitance, is similarly created between the respective primary and secondary windings 46, 48. In the receiver transformer, the ratio of the primary and secondary windings can be about 1:1. While this ratio can be altered or modified, such a change requires a resultant alternation in the size of the air gap, i.e. the relative ratio of 2R and 2r. The capacitor network $C_{eq2}$ is set to resonate with the primary winding at carrier frequency FB, thus creating a band pass filter at carrier frequency FB.

Figure 5:
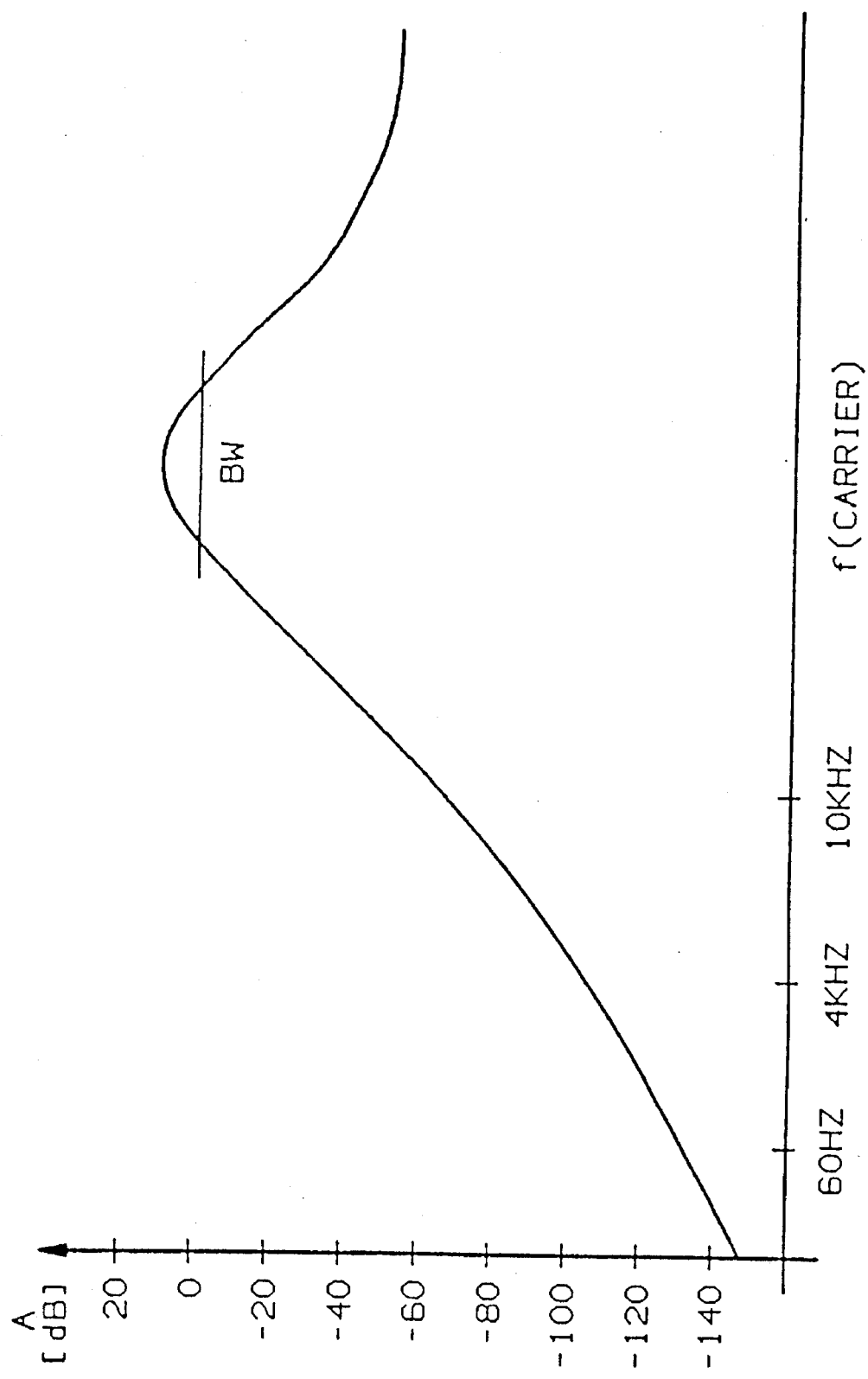
FIG. 5 illustrates the frequency characteristics of the phase shift linear coupler of the present invention.

In operation, the power line voltage is significantly reduced by $C_{eq2}$ and the resistors. Thus, the static capacitance with the secondary winding significantly attenuates the 60 Hz and its harmonics, thus effectively functioning as a high pass filter. The carrier frequency voltage is thereby maximized. The air-core transformer produces a wider phase linear bandwidth than previous systems. The bandwidth characteristics of the present invention are shown in FIG. 5. For good reception, the resistivity of the primary can be equal or greater than the lowest characteristic impedance of the power line.

From a design standpoint, the philosophy is to minimized the 60 Hz line current and its harmonics at the output of the coupler. For higher voltage power-line coupling the coupling capacitor, $C_{eq}$, should have a smaller value:

$(f)^2$(carrier)/$(f)^2$(60 Hz) ratio determines the $V_{carrier}/V_{60 Hz}$ ratio at the output of the coupler. Preferably, a higher carrier frequency should be used for higher power line voltages. Vcarrier is measured at the preselected carrier frequency at the secondary output of the receiver coupler in volts. $V_{60hz}$ measured at the same location of $V_{carrier}$, is the voltage of the 60 Hz.

The above relationships coupled with the capacitive transformers serve to block the 60 Hz line current. The resistive matching serves to reduce power line noise at the bandwidth. The above makes it possible to communicate directly through power line transformers. The use of an air-core transformer reduces reflected impedances from the secondary side as well as from the power line transformer to the primary side of the air-core transformer.

Figure 20:
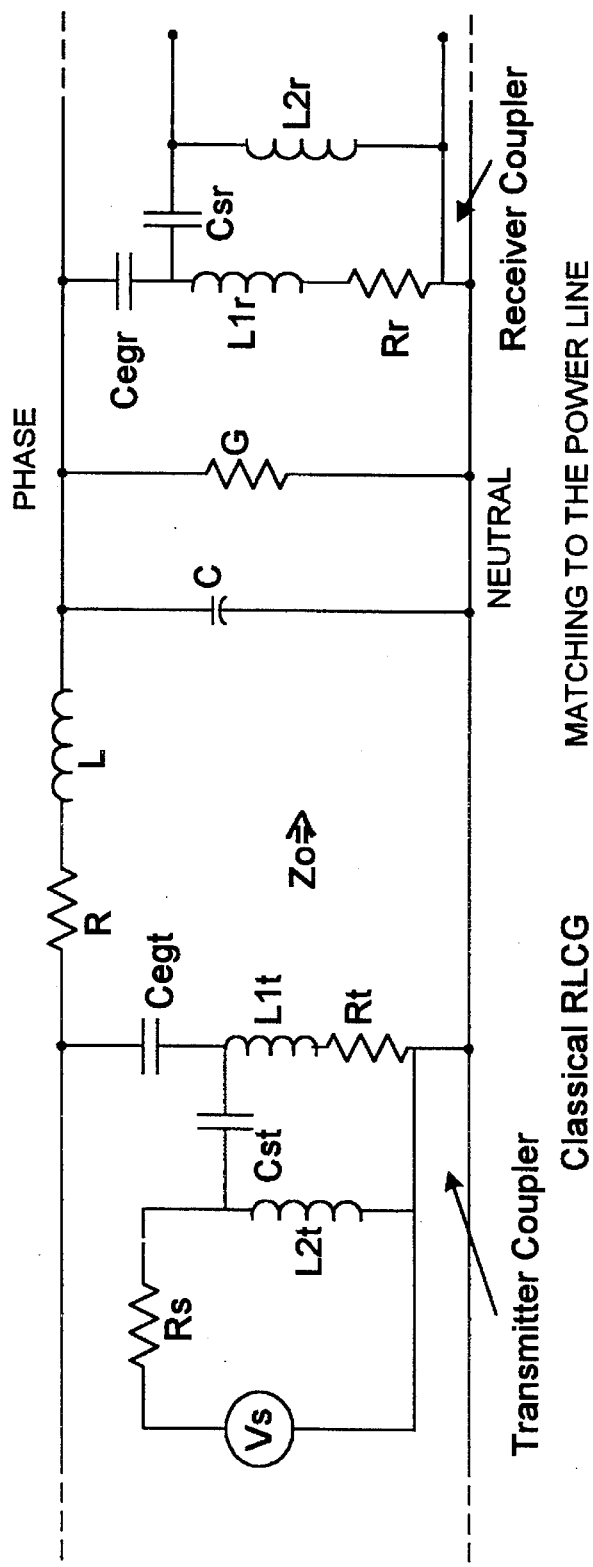
FIG. 20 is an equivalent circuit model for a power-line carrier communication system with resistive matching to the power line characteristic impedance by the coupler.

The theoretical operation of the circuit is seen with reference to FIG. 20, an equivalent circuit model for a powerline carrier communication system with matching resistors $R_t$ and $R_r$. At primary resonation, the LC impedances will be zero at transmission and reception such that the resistivity of the primary coil $R_t$ matches the characteristic impedance of the power line. On the receiver side, $R_r$ can be equal or larger than the characteristic impedance of the power line. Due to the use of the air-core transformer and resistive matching, the whole power line system can be phase shift linearized even through a power line transformer. These relationships facilitate error free and high speed communications over long distances.

Figure 26:
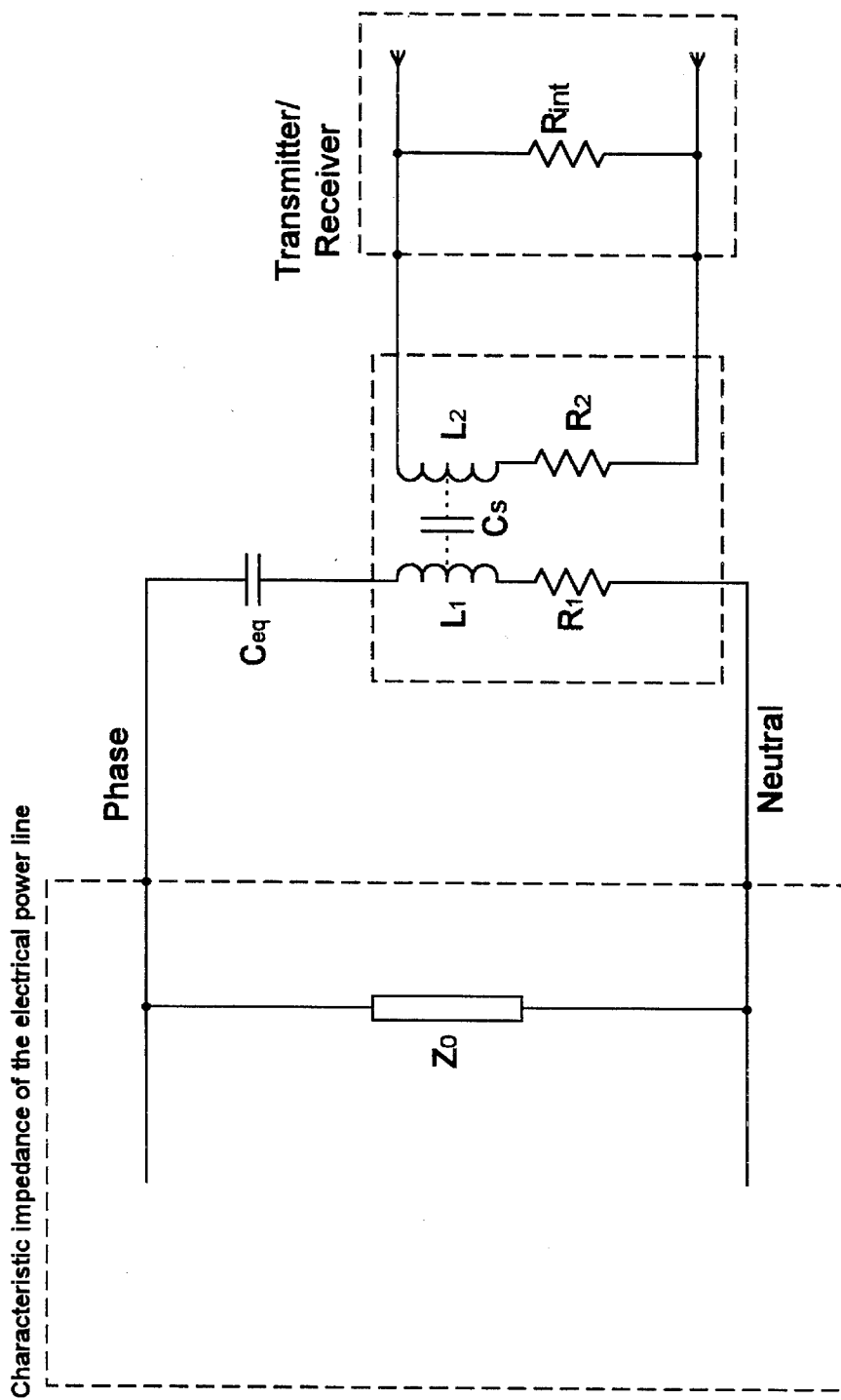
FIG. 26 is an equivalent circuit model for a power-line carrier communication system with resistive matching to the power line characteristic impedance by the coupler.

FIG. 26 shows a powerline communications system for matching the characteristic impedance of an electrical line using an air-core (or dielectric) coupler (or transformer) which is capacitively and inductively coupled to the electrical line. In FIG. 26, Zo is the characteristic impedance of the electrical line where Zo is approximately equal to the square root of L/C and L and C are the inductive and capacitive components, respectively, of the electrical line.

$C_{eq}$ and $L_1$ are the equivalent capacitance and the inductive component of the Primary of the air-core coupler. $R_1$ is the resistive value of $L_1$. $L_2$ is the inductive component of the secondary of the air-core coupler. $R_2$ is the resistive value of $L_1$. $R_{int}$ is the impedance of the transmitter or the input impedance of the receiver, depending upon whether the air-core coupler is operating as a transmitter or receiver. FIG. 26 illustrates the air-core coupler of the present invention working either as a transmitter or a receiver (or transceiver).

The air-core coupler primary winding is matched to the electrical line characteristic impedance at a preselected frequency band, as well as to the other couplers attached to the electrical line at the same frequency. The secondary winding is matched to the transceiver (transmitter and/or receiver) input impedance. Since the values of $L_1$ and $C_{eq}$ approach zero at the preselected frequency F1, where F1 is given by equation (1).

$$F1 = \frac{1}{2\pi \sqrt{L_1 C_1}} \quad (1)$$

(where F1, $L_1$ and $C_1$ are approximately zero), $R_1$ (and the rest of the $R_1$ values for any other couplers) will match Zo and $\omega L_2$ will match $R_{int}$ if standard copper magnetic wire is used for the primary and secondary windings.

If a resistance wire, such as Deltalloy wire having a specific resistivity of 675 OHM°CIR. MIL. FT. with a composition of 15% Chromium and 60% nickel, available from Delta/PWF Corp., $R_2$ can be increased and a wider bandwidth can be achieved. A preferred resistance wire has a light magnetic attraction of approximately 5–10 ohms per foot for #24–#34 gage wire (for example, 8.25 ohms per foot for #30 gage wire) which is coated/insulated.

The wider bandwidth results from $R_2$ being greater than $\omega L_2$ as $Q=\omega L/R$. The larger $R_2$ value from the resistance wire will also provide a more stable band. By matching resistance values a more linear band is also achieved, as compared to matching inductance values to resistance values.

The coupling means 14, 22 shown in FIGS. 6, 7, 8, 9A and 9B are suitable for communication in association with wide range of power-line voltages. As will be discussed herein, they can be utilized for high voltage, low voltage, twisted pair, coaxial, and phone line communications, as well as for communication directly through power line transformers.

A. Communications Options

1. Computer Communication through Power, Coaxial and Twisted Pair Lines

The couplers of the present invention can be applied to LAN (local area network) communications and facilitate communication speeds up to 10 Kilobaud. For this application, the coupling means 14 preferably use a first carrier frequency FA of around 75 KHz (and 81.5 KHz for FSK) and a second carrier frequency FB of around 111 KHz (and 117.5 KHz for FSK) over power-lines 12 of up to about 1 KVAC. The coupler preferably uses first pluralities of capacitors 34, as shown therein, the coupling capacitor equivalent circuit is equal to 90 nanofarads. The first air coil 36 should have a primary winding 38 with a coil diameter of 2.2 cm, #26 gauge magnet wire and a secondary winding 40 with a coil diameter of about 1.7 cm, #28 gauge magnet wire. The second plurality of capacitors 42 has an equivalent circuit equal to 15 nanofarads. The second plurality of capacitors 42 has an equivalent circuit equal to 15 nanofarads. The second air coil 44 should have a primary winding 46 of 2.2 cm, #30 gauge magnet wire and a secondary winding 48 with a coil diameter of about 1.7 cm, #28 gauge magnet wire. The system utilizes the modems shown in FIGS. 10A, 11 and 12A. Using a suitable transistor for transmitting, the communication speed can be increased above 9.6 kbaud over power, twisted pair, and coaxial lines.

On the other side of the system, coupling means 22 comprises first plurality of capacitors 34 as shown therein, the coupling capacitor equivalent circuit is equal to 40 nanofarads (this includes the static capacitance of the air-core transformer). As above, the first air coil 36 should have a primary winding 38 with a coil diameter of 2.2 cm, #26 gauge magnet wire and a secondary winding 40 with a coil diameter of 1.7 cm, #26 gauge magnet wire. The second plurality of capacitors 42, as shown therein, coupling capacitance equivalent circuit is equal to 33 nanofarads. The second air coil 44 should similarly have a primary winding 46 of about 2.2 cm, #34 gauge magnet wire and a secondary winding 48 with a coil diameter of 1.7 cm of the #30 gauge magnet wire.

For duplex operation the resistive matching at the frequencies should be less than 1 Ohm for transmission and 3 Ohms for reception. For half duplex operation the resistive matching should be about 1 Ohm for both transmission and reception.

2. High Voltage Power Line Communications

The couplers are also applicable to high voltage power line communication applications in which a 15 KVDC/4.5 KVAC capacitor can be used for power-line voltages of up to 765 KV. The couplers of the present invention can be utilized for communication speeds up to 9600 baud. In this application first FA and second FB carrier frequencies of 80 KHz and 115 KHz, respectively, are preferred, and the connections of first 34 and second 42 pluralities of capacitors are somewhat modified over what is shown in FIGS. 7 and 9. The first plurality 34 comprises a 2 nanofarad coupling capacitor for 80 KHz transmission. The second plurality 42 comprises a 0.5 nanofarad coupling capacitor for reception. It is to be appreciated that the above system will be comparatively large, having a height of approximately fifteen feet and will typically be located at a ground station adjacent to large high voltage transmission line.

Referring to the air-core transformers for this application, the first air coil 36 of the coupling means 14 suitably comprises a primary winding 38 with a coil diameter of 8.9 cm, #24 gauge magnet wire, and a secondary winding 40 with a coil diameter of 6.0 cm of #16 gauge magnet wire. The second air coil 44 likewise suitably comprises a primary winding 46 of 7.3 cm, #26 gauge magnet wire, and a secondary winding 48 with a coil diameter of 4.8 cm, #16 gauge magnet wire. The inductivity of the primary is calculated according to the equation $L=\frac{1}{4} \, ^2 \, f^2 \, C_{eq}$ The identical coupling means 22 under the same circumstances also includes the capacitor pluralities 34, 42. The first plurality 34 suitably comprises a 1 nanofarad coupling capacitor for transmission at 115 KHz, while the second plurality 42 comprises a 1 nanofarad coupling capacitor for 80 KHz reception. The first air coil 36 comprises a primary winding 38 with a coil diameter of 8.9 cm, 24 gauge magnet wire and a secondary winding 40 with aircoil diameter of 6.0 cm, #12 gauge magnet wire. The second air coil 44 likewise suitably comprises a primary winding 46 of 8.9 cm, #26 gauge magnet wire and a 48 with a coil diameter of about 6.0 cm, #16 gauge magnet wire. No ferrite transformer is found within the transmitter and receiver. It is also possible that no receiver is needed. The resistive matching for transmission is about 5 Ohms and for reception is about 10 Ohms for duplexing operations. A resistive match of approximately 5 Ohm is needed for half duplexing operation where transmission and reception occurs in several locations.

Figure 21:
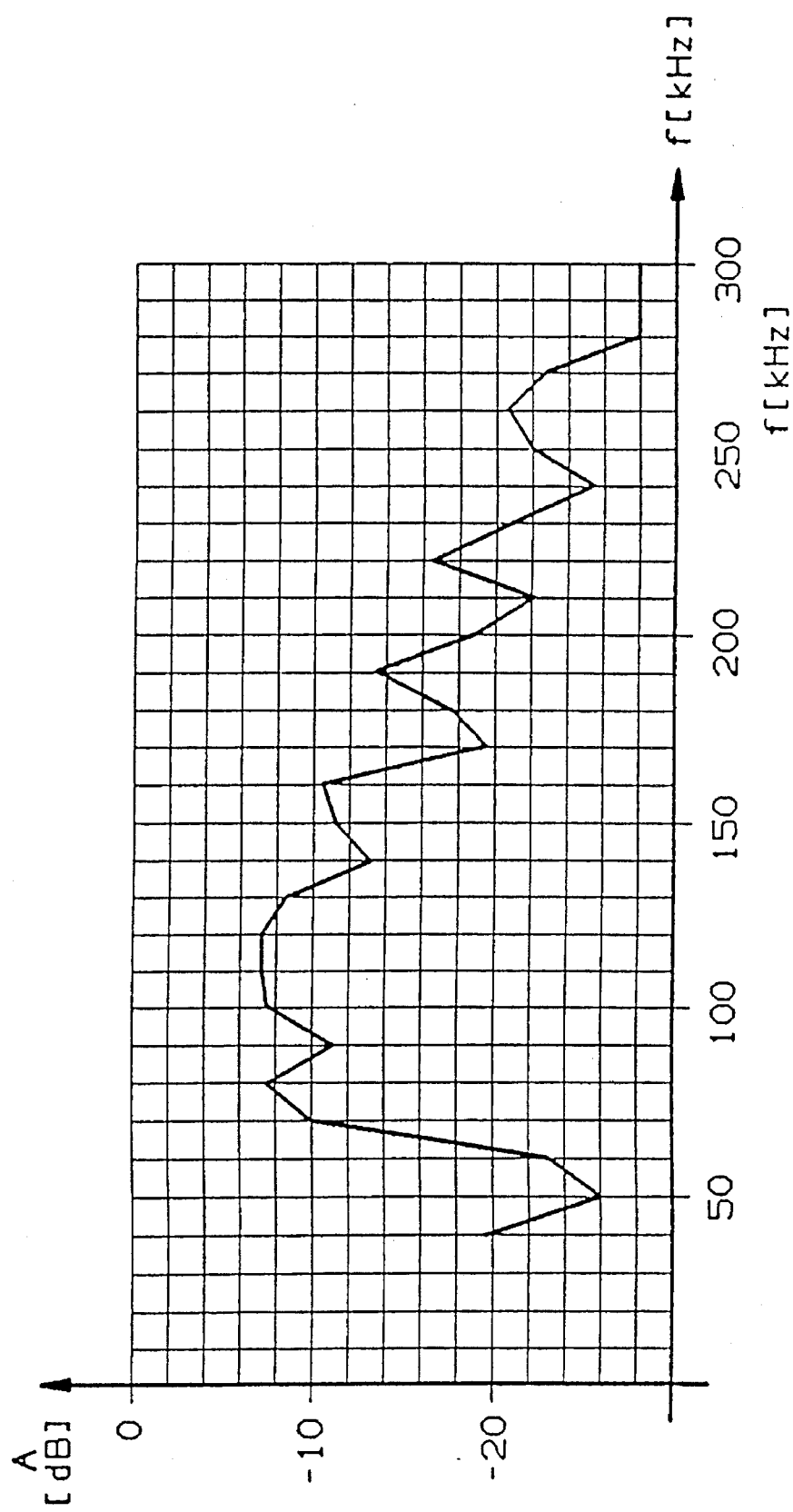
FIG. 21 is a graph of power line attenuation versus carrier frequency on the 35 KVAC power line for a 20 KM distance.

FIG. 21 is a graph of power-line attenuation versus carrier frequencies on the 35 KVAC power line for 20 KM distances. A 150 Ohm load was used for the matching conditions. The best range of communication can be seen here from 70 to 160 KHz. As the number of transformers on the power line increases, the attenuation of the power line will increase especially above 100 KHz. Note that the diameter of the coils is partially determined by the available size of the PVC pipe because the windings are made on said pipe.

3. Communication Through Power Line Transformers

Figure 22:
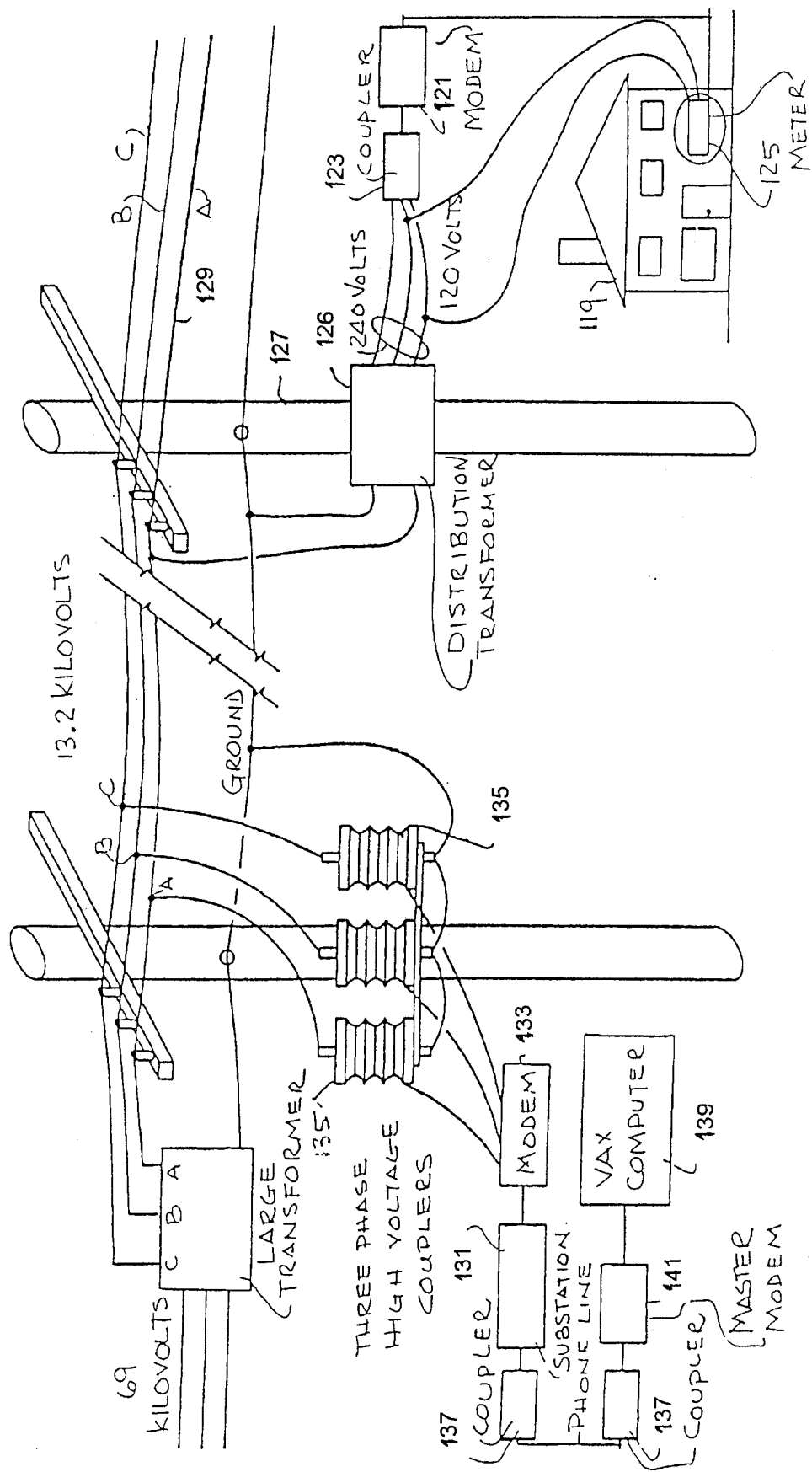
FIG. 22 is an illustration of an electric meter reading system incorporating the communication system of the present invention which may be implemented by a public utility.

As noted above, the communication apparatus of the present invention may also be utilized for communication through powerline transformers (See FIG. 22). The couplers permit communication through transformers at communication speeds of over 1200 baud. It is to be appreciated that for communication through the transformer in FSK, PSK, ASK, FDM or Spread Spectrum using half-duplex with F1=30 KHz and F2=31.6 KHz, using five serial and 100 nanofarad (4.5 KVAC) capacitors connected serially with 6 Megaohm, 5 watt resistors (up to 22 KV power-line), the bandwidth of the couplers will cover the F1 and F2 frequencies.

FIG. 9C illustrates a half-duplex coupler for data communication through the high voltage side of distribution transformers. In this system two or three solenoids (air-coils) having two or three different diameters are utilized. The diameter of outer coil 54 is 6.0 cm, #26 gauge magnet wire, the middle 56 is 4.8 cm, #20 gauge magnet wire and the smallest 58 is 4.2 cm, #22 gauge magnet wire. The largest diameter outer coil 54 is the primary which resonates with the capacitor, the middle is the transmitter and/or receiver coil 56 and the smallest is the receiver coil 58 (if it is needed). For reception, the transmitter coil must be uncoupled. In order to have transmission, the receiver coil is uncoupled.

On the low power side of the power line distribution transformer corresponding to the 120, 240 and 480 V power lines, the system can be configured to use the same carrier frequency, with one coupler on the low voltage side (i.e. a single primary and single secondary). (See FIG. 22). The transformer is coupled to 66 nanofarad capacitors~500 VAC). In this situation, the primary coil 38 has a diameter of 2.7 cm using #24 gauge magnet wire with the secondary coil 40 having a diameter of 2.2 cm using #26 gauge magnet wire. The transmitter and receiver do not contain a ferrite transformer. It is also possible that no receiver will be needed. Theoretically, a real time 4800 baud can be achieved through power line transformers over long distances.

It is to be appreciated that the couplers of the present invention will permit more than one carrier frequency to be simultaneously transmitted through the same power line.

B. Transmitter and Receiver Devices

Figure 11:
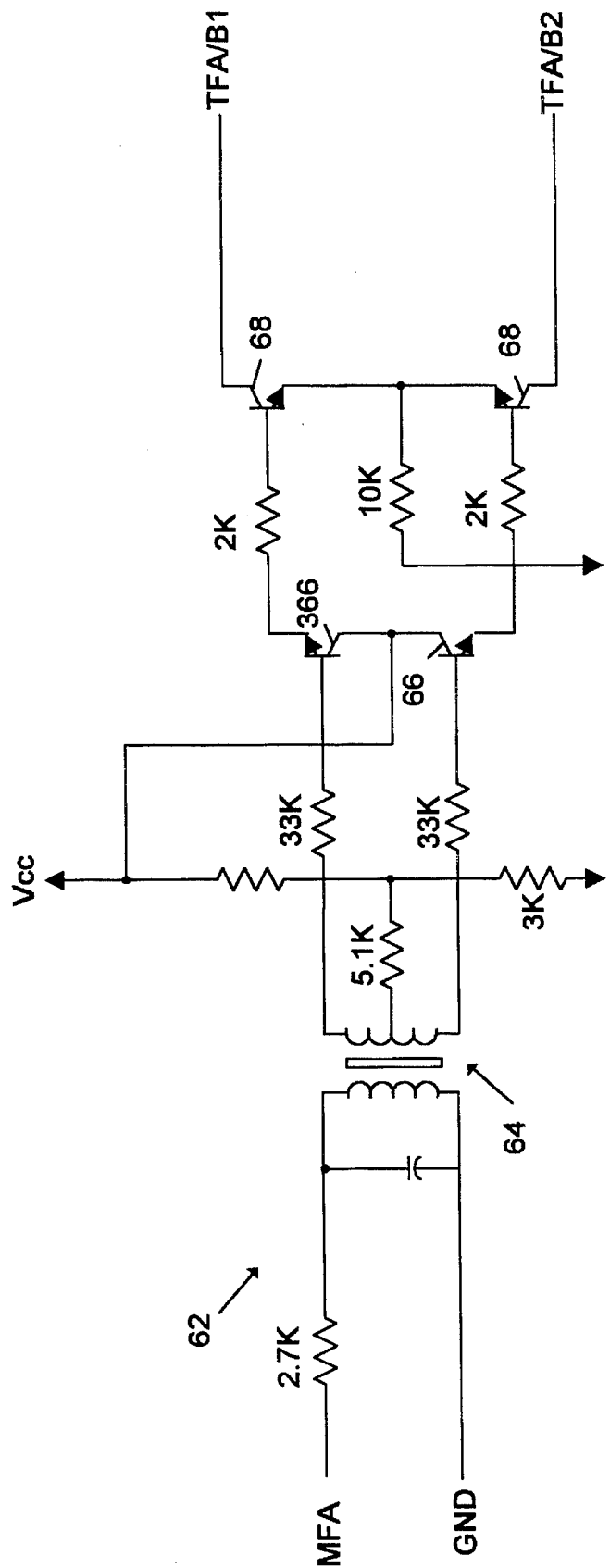
FIG. 11 is a schematic diagram of a transmitter means used in the present invention.

The preferred transmitter 16, 24 useful in the power-line communication of data signals over long distances is shown in FIG. 11. This transmitter can be utilized in all of the applications of the present invention, including transmission through power line transformers. The transmitter means generally comprises a driver 62 which is connected to the coupling means 14, 22 by way of their respective connections TFA/BI, TFA/B2. Because of its use of a magnetic coil 64 and transistors 66, 68, the transmitter 16 while comparatively slow, is especially useful over high voltage power lines. Suitable transistors 66 for this transmitter are conventional SK 3444, while the transistors 68 may suitably comprise conventional SK3024. For higher power transmission, 2N3055 transistors may be utilized instead of SK3024. The particular value of each resistor and capacitor shown in FIG. 11 will depend upon the specific operating characteristics of the driver but they would be readily ascertainable without undue experimentation by one of ordinary skill in the art of electronics. Nevertheless, exemplary values of the resistors and capacitors are shown in FIG. 11. It is also understood that without a ferrite transformer, this modified transmitter is able to transmit at a high communication speed.

Figure 12:
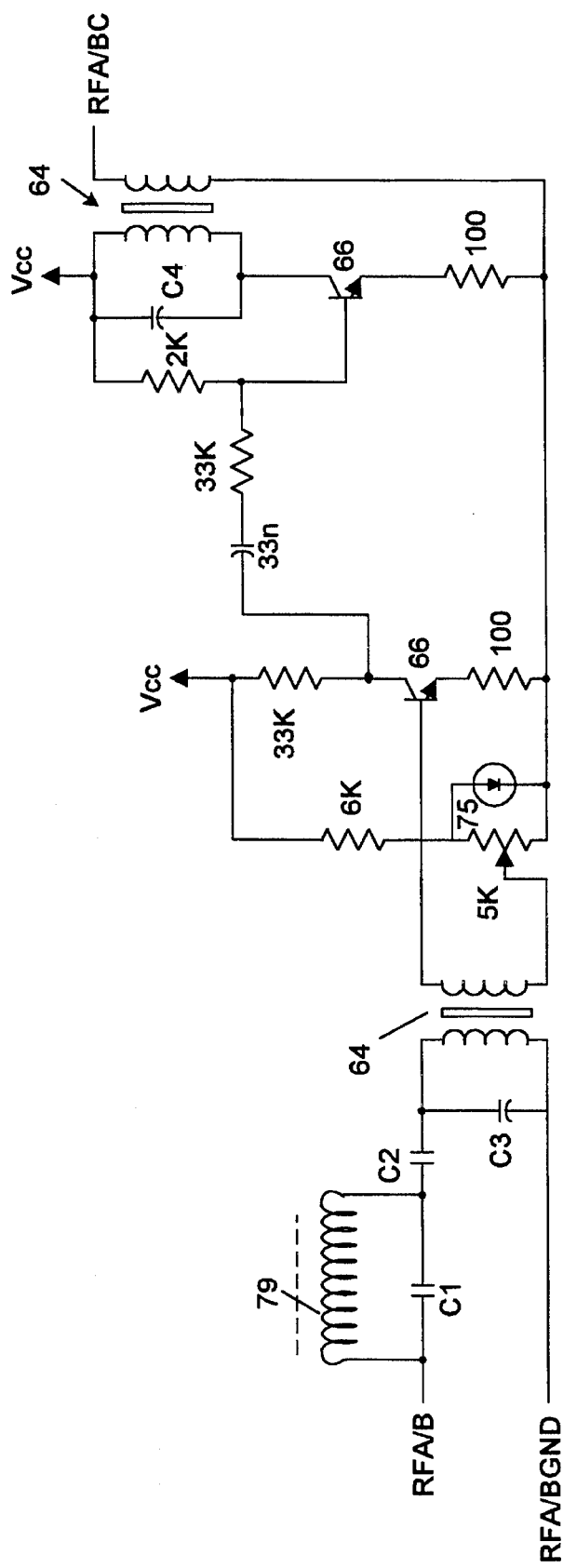
FIG. 12 is a schematic diagram of receiver means used in conjunction with the transmitter means shown in FIG. 11, in the power-line communication of data signals over long distances.

The preferred receiver means 18, 26 which is useful in the power-line communications of data signals over long distances is shown in FIG. 12. The receiver means 18, 26 is similarly connected to the coupling means 14, 22 by way of their respective connections RFA/B, RFA/BGND and RFA/BC. It will be readily apparent that the receiver means 18, 26 is more successful at attenuating out of band noise especially on high voltage power lines. Suitable transistors 66 are also conventional SK3444. The particular value for each resistor and capacitor shown in FIG. 12 would depend upon specific operating characteristics of the receiver 18, but they would be readily ascertainable without undue experimentation by one of ordinary skill in the art of electronics. Nevertheless, exemplary values of the resistors and capacitors are shown in FIG. 12. A key feature of the receiver of FIG. 12 is the inclusion of potentiometer 75 with which the bandpass filter receiver bandwidth can be changed. Another feature is the notch filter 79 coupled to magnetic coil 64 (band pass filter) which filters out transmission frequencies on the same side.

Figure 12A:
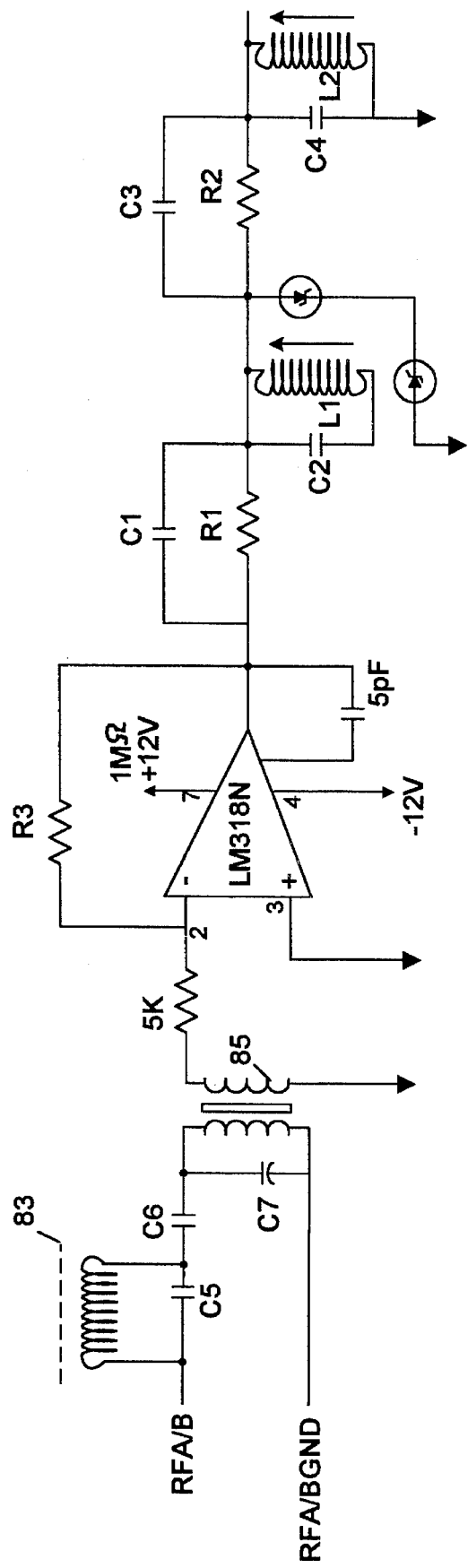
FIG. 12A is a schematic diagram of a receiver which can be used for high speed communications.

FIG. 12A shows an additional receiver 18', 26' which can be utilized between 120 V and 240 V including FSK, and which is particularly suited for low voltage LAN communications. In this receiver, $C_1$ and $R_1$ are used for F1; and $C_3$ and $R_2$ are used for F2 in a high pass configuration. In a low pass configuration, $C_2$ and $L_1$ are used for F1 and $C_4$ and $L_2$ are used for F2. The receiver further utilizes a notch filter 83 coupled to band pass filter 85 which filters out transmission frequencies. It is also appreciated that using no receiver or a modified receiver which does not contain a ferrite transformer the communication speed can be significantly increased.

C. Modulator/Demodulator Circuits

Figure 10A:
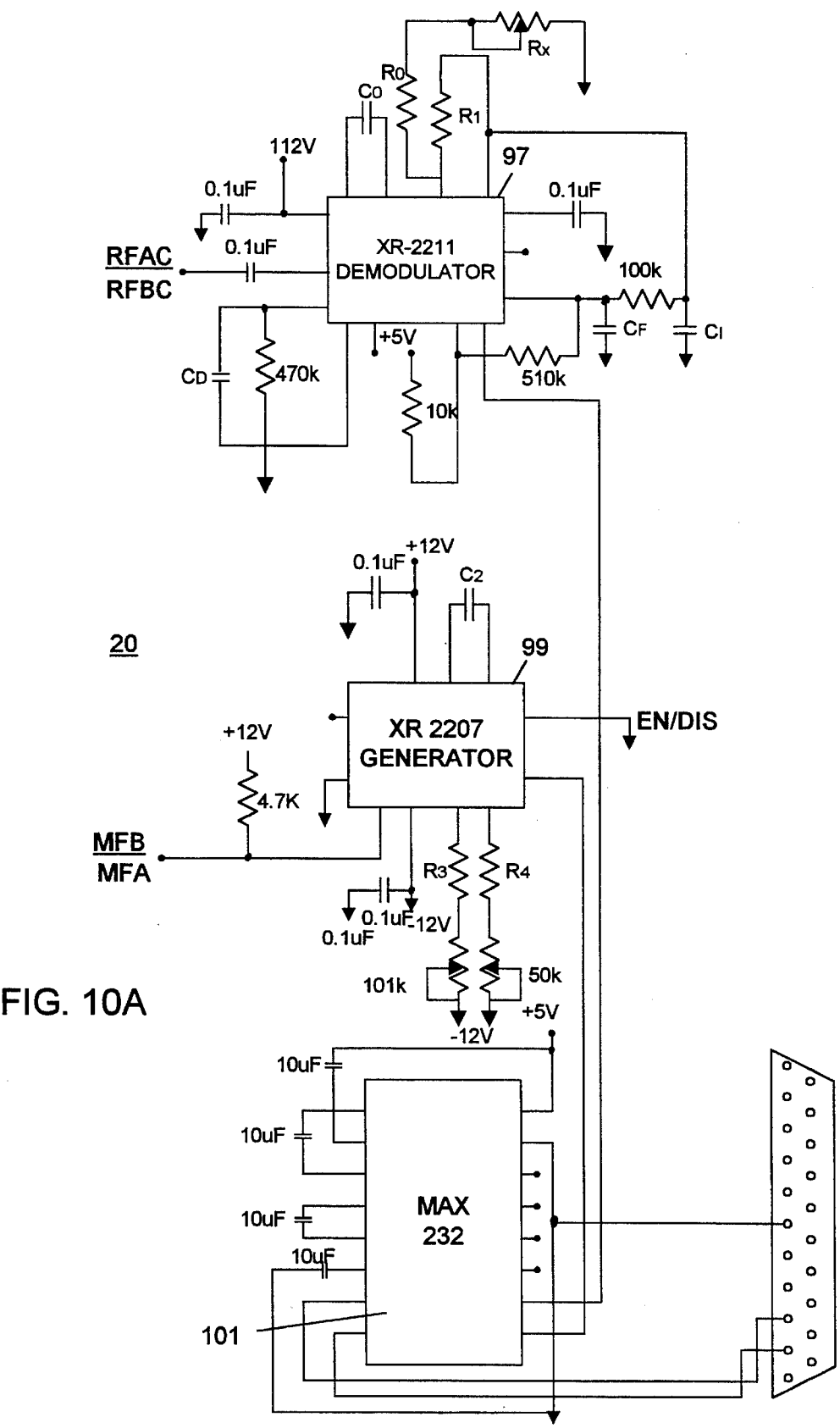
FIG. 10A is a schematic diagram corresponding to the modulator FA/demodulator FB shown in FIG. 6.

The modulation and demodulation of the data signals is now described with reference to FIGS. 10A and 10B. FIGS. 10A illustrates an FM modulator and demodulator 20. This circuit is particularly applicable for high voltage communication and particularly high voltage communication through power-line transformers. The circuit comprises an XR-2211 FSK demodulator 97 XR-2207 FSK generator 99 and MAX232 computer input/output interface 101. The values for $R_0$, $C_0$, $C_1$, $C_2$, $C_3$, and $C_4$ are utilized to alter the carrier frequencies (FA and FB). The values of $C_1$, $R_3$, and $R_4$ are varied to alter the FA and FB carrier frequencies.

Figure 10B:
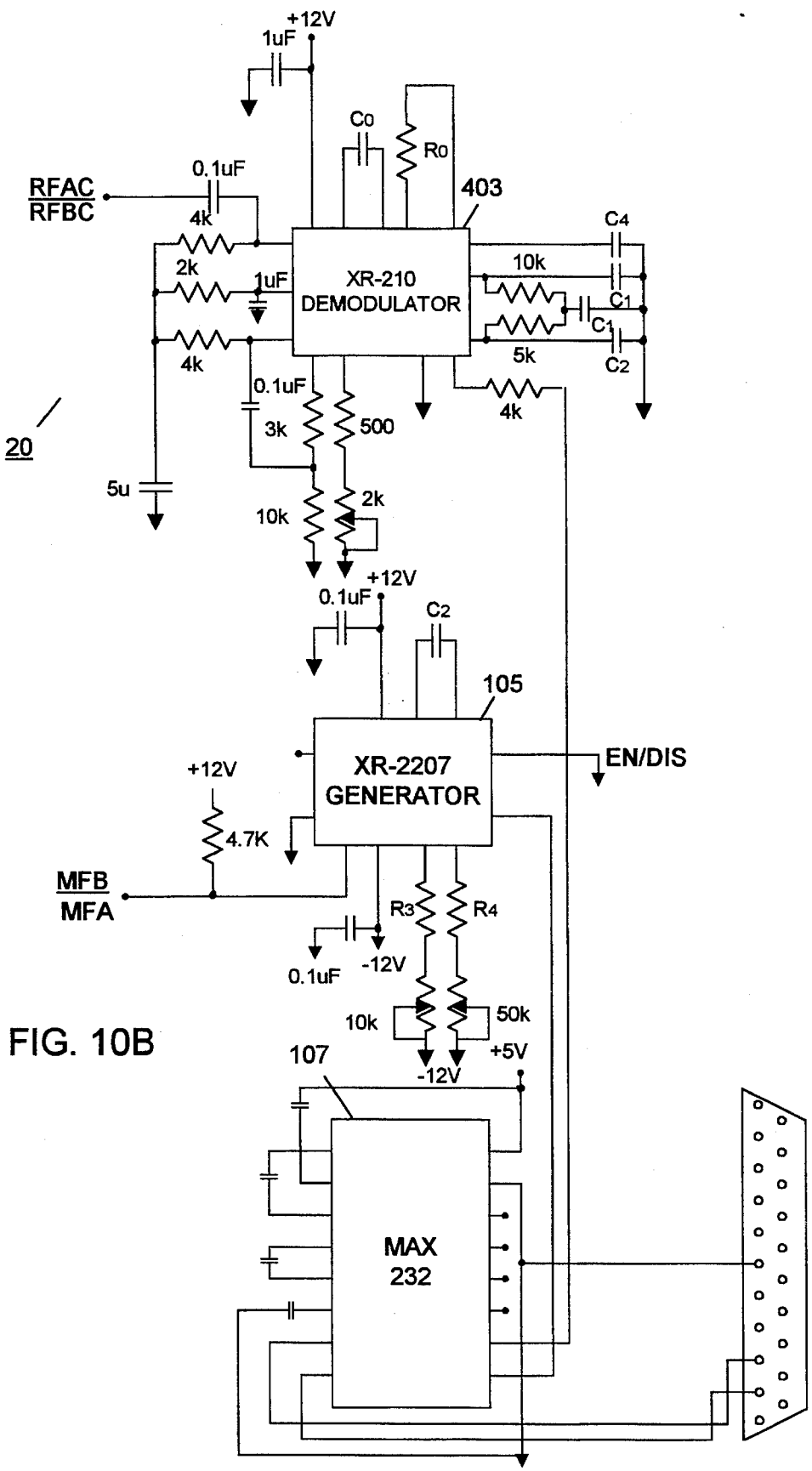
FIG. 10B is a schematic diagram of an alternative modulator FA/demodulator FB for the system in FIG. 6.

FIG. 10B illustrates an alternative FM modulator and demodulator 20' for high frequency communication for LAN and phone line communication. The circuit incorporates the XR-210 FSK demodulator 103, XR-2207 FSK generator 105 and MAX232 computer input/output interface 107. The values for $R_0$, $C_0$, $C_1$, $C_2$, $C_3$, and $C_4$ are utilized to alter the carrier frequencies (FA and FB). The values of $C_1$, $R_3$ and $R_4$ are varied to alter the FA and FB carrier frequencies.

Figure 10C:
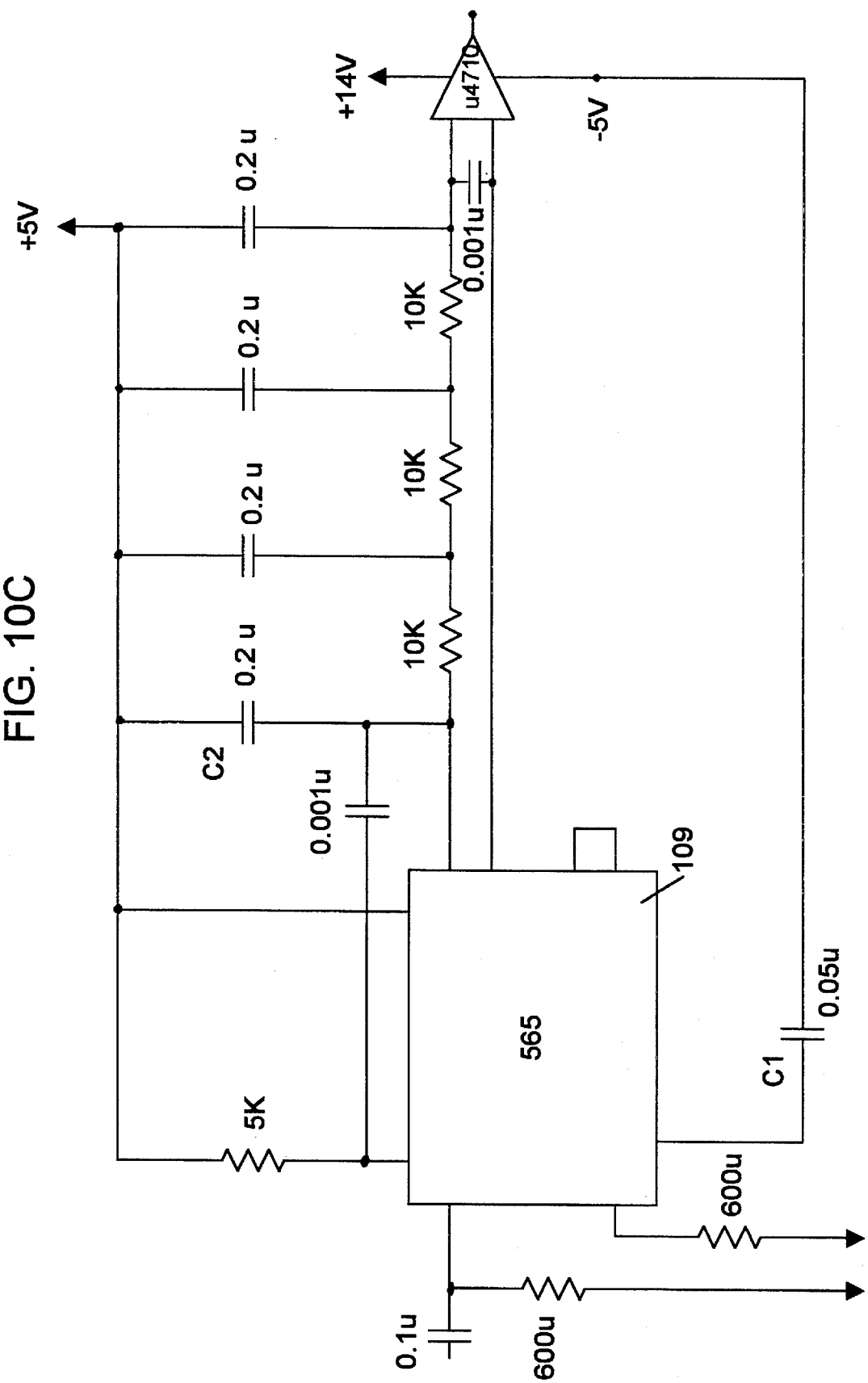
FIG. 10C is an FSK decoder phase lock loop which can function as the modulator/demodulator circuit of FIG. 6.
Figure 10D:
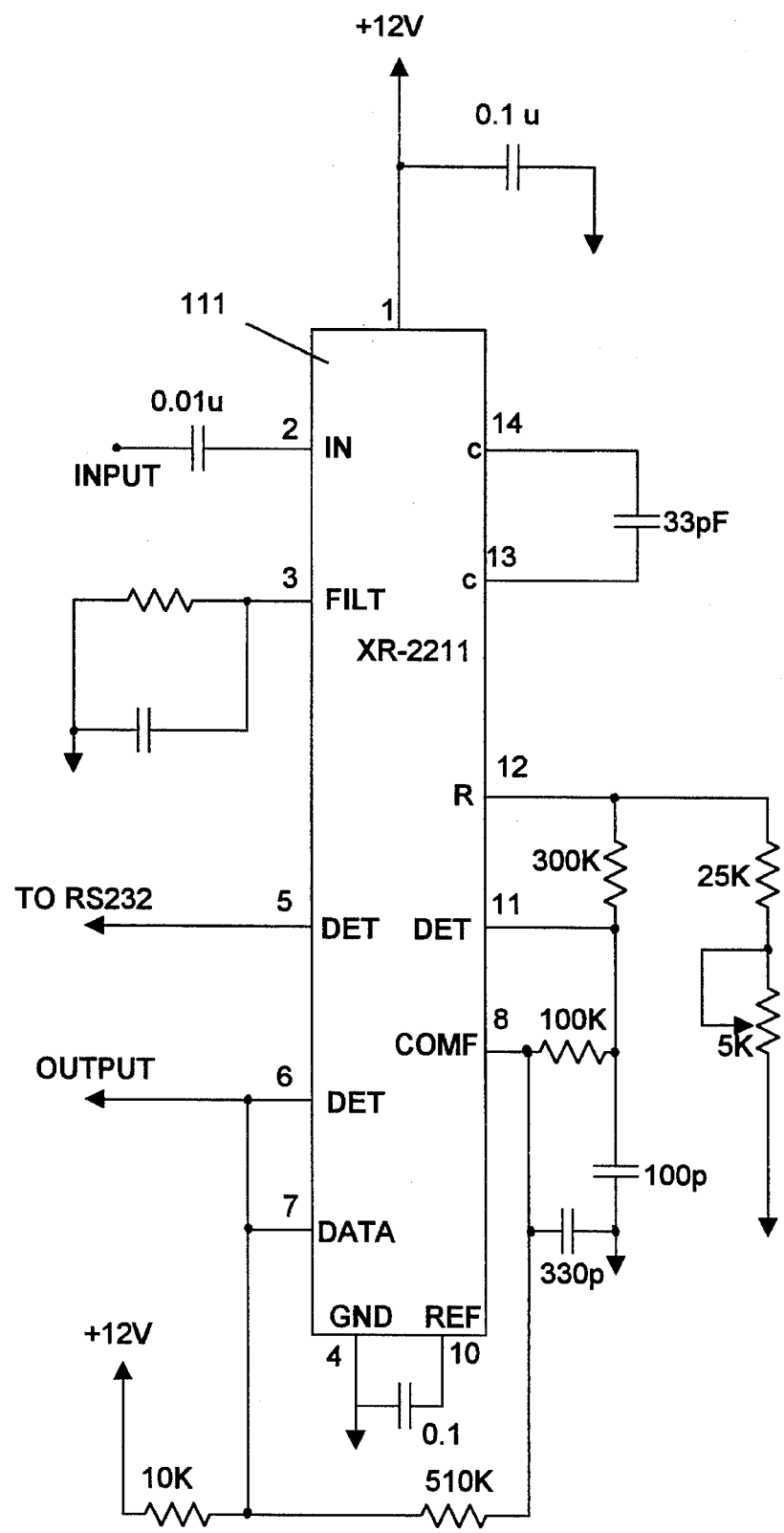
FIG. 10D is the primary phase lock loop of FIG. 10A.

FIGS. 10C and 10D illustrate additional modulator/demodulator circuits 20", 20"' which can be utilized in the present invention. FIG. 10C shows an FSK decoder using the 565 interface 109. The loop filter capacitor is chosen to set the proper overshoot on the output and a three-stage RC ladder filter is used to remove the noise frequency component. As shown in FIG. 10D, another FSK chip, the XR2211 111, can be used to demodulate and the XR2207 (not shown) can be used for modulation.

Modem Circuits

Figure 18:
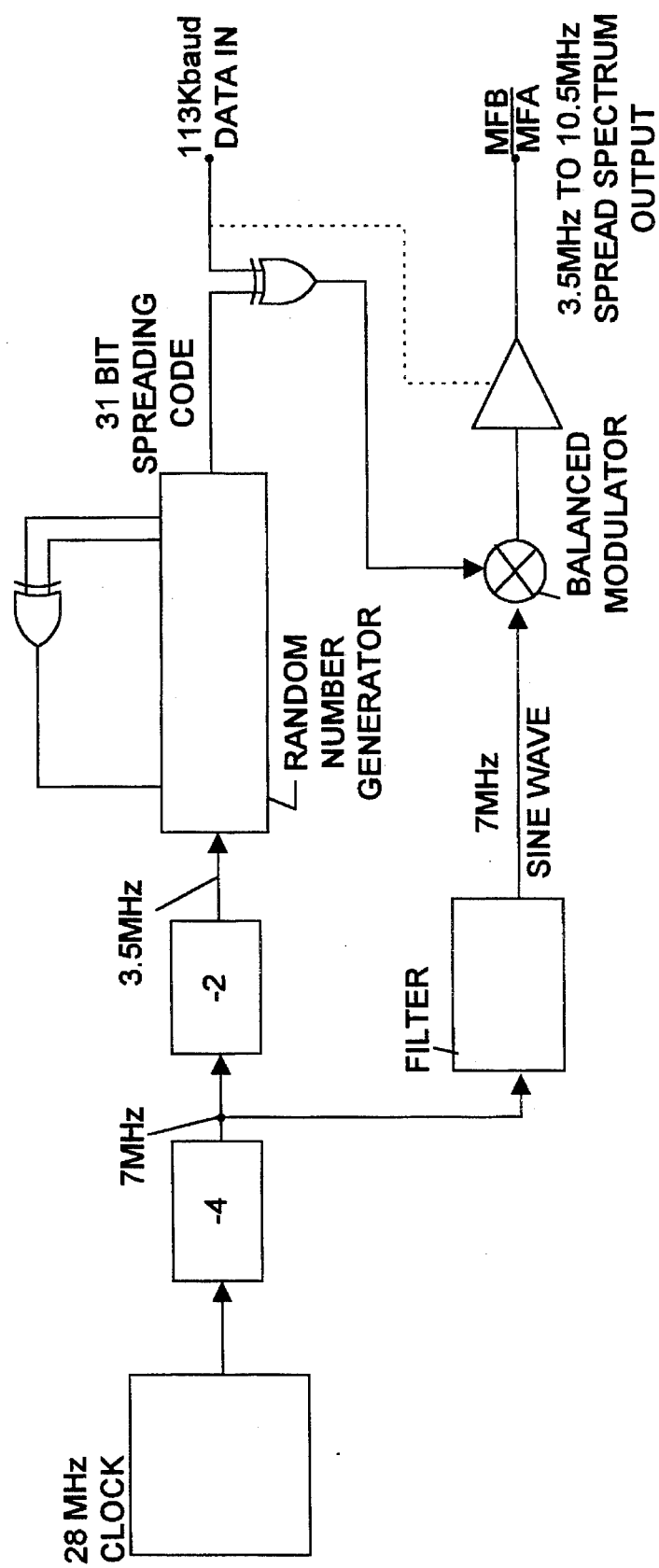
FIGS. 18 and 18A show a spread spectrum transmitter/receiver in accordance with the present invention which is particularly applicable for communication in between noise.
Figure 18A:
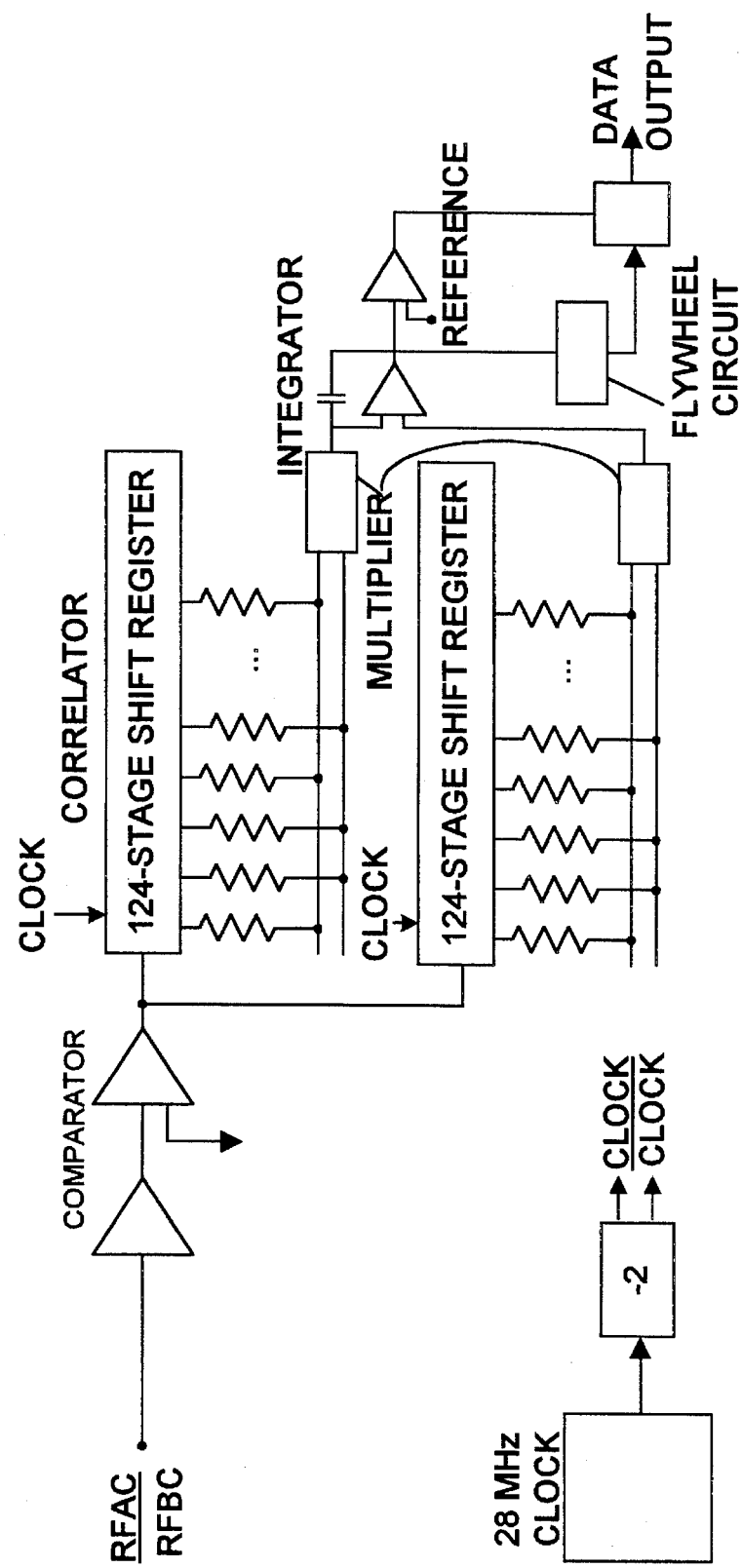
Figure 19:
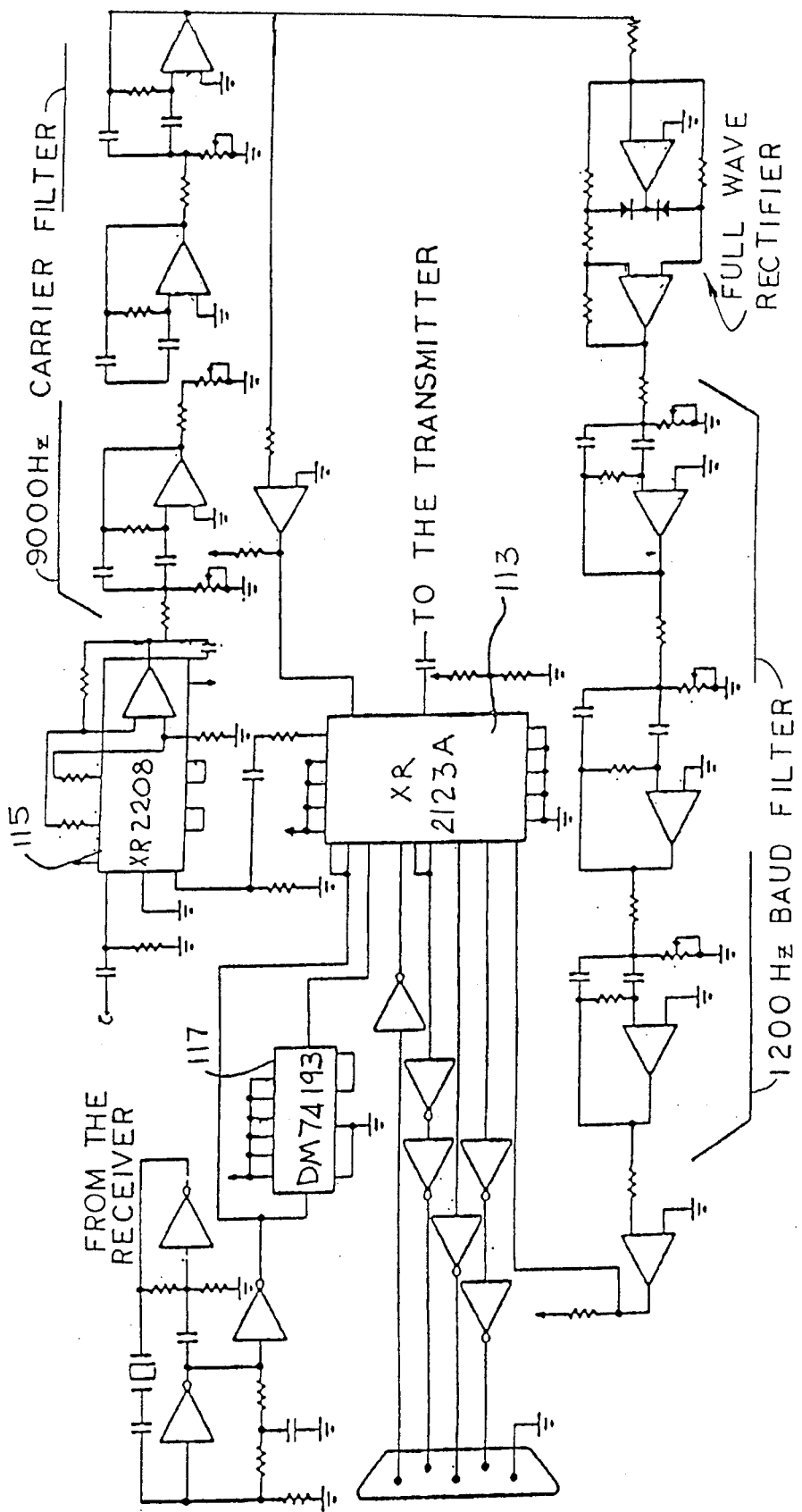
FIG. 19 phase shift keying modulator/demodulator which can be utilized with the present invention.

FIGS. 18 and 19 illustrate two complete modem configurations which can be utilized in the present invention. FIG. 18 is a spread spectrum transmission and receiver modem. This circuit is suited for communication through high voltage AC and DC power lines and for communication through transformers. The spread spectrum modem can be used for error free communication over long distances.

FIG. 19 illustrates a phase shift keying transceiver modem circuit particularly applicable for phone line and LAN communication. This circuit includes an XR 2123 modulator/demodulator 133, XR2208 Operation Multiplier 115, and DM74193 synchronous up/down counter 117. This circuit requires a smaller bandwidth for communication than FSK because it uses only one carrier frequency while changing sine and cosine waves. The carrier frequency must always be at least 10 dB above the noise.

Operational Example

The particular attributes of the apparatus and configurations of the present invention are perhaps best illustrated in view of the following comprehensive example described with reference to FIGS. 22–25. This example utilizes most of the coupler configurations and modems discussed above and illustrates how the communications apparatus and novel couplers of the present invention can be utilized in a comprehensive system using LAN, phone line, high voltage and low voltage power line communications, as well as communication through power line transformers.

FIG. 22 illustrates an example of the couplers of the present invention as they may be utilized by an electric power public utility for reading home power meters. In this example, each house 119 receiving electric power from utility would have a modem 121 and air coil transmitter and receiver coupler circuit 123 in accordance with the present invention coupled to the electricity meter 125. The coupler 23 would connect to the 240 low volt distribution transformer 126, via low voltage lines, situated on the utility pole 127 located adjacent to the house 119. The couplers will have the low voltage-configuration which is capable of communicating through power line transformers such as discussed in section A.3. above. The system will utilize the transmitters, receivers, modulators/demodulators, or modem circuits disclosed in FIGS. 10A, 11 and 12. The distribution transformer will be connected to one of the three 13.2 KV power lines 129 on the utility pole 127.

At the other end of the system situated at a local substation 131, a second substation modem 133 is connected to one of three couplers 135 in accordance with the present invention. The couplers are encased in resin, as disclosed above, and will preferably have the high voltage side transformer configuration set for the in FIG. 9C. The substation 133 is itself connected via couplers 137 such as disclosed in section A.1 to the large central computer 139 of the utility (generally a VAX) via phone lines. The substation 131 and computer 139 will communicate over the power or phone line at rates up to 10K baud as set forth herein using the high speed couplers and the appropriate high speed modems.

When the utility desires to make a meter reading, the central computer 139 will issue an addressable command which is transmitted via a master modem 141 and coupler 137 to the particular substation at speeds up to 10K baud over power or conventional phone lines 138. The substation will then transmit an addressable command to a particular meter via modem and couplers. The command is transmitted over the 13.2 KV line at speeds up to 1200 baud, through the distribution transformer, through the home couplers 123 and modem 121. A meter reading is recorded, transmitted by the home modem 121 through couplers 123, through distribution transformer 126, over the 13.2 KV power line 129 to the appropriate substation coupler 135 and to the substation modem 133. The system only requires between one and ten watts for power transmission in both directions.

Figure 22A:
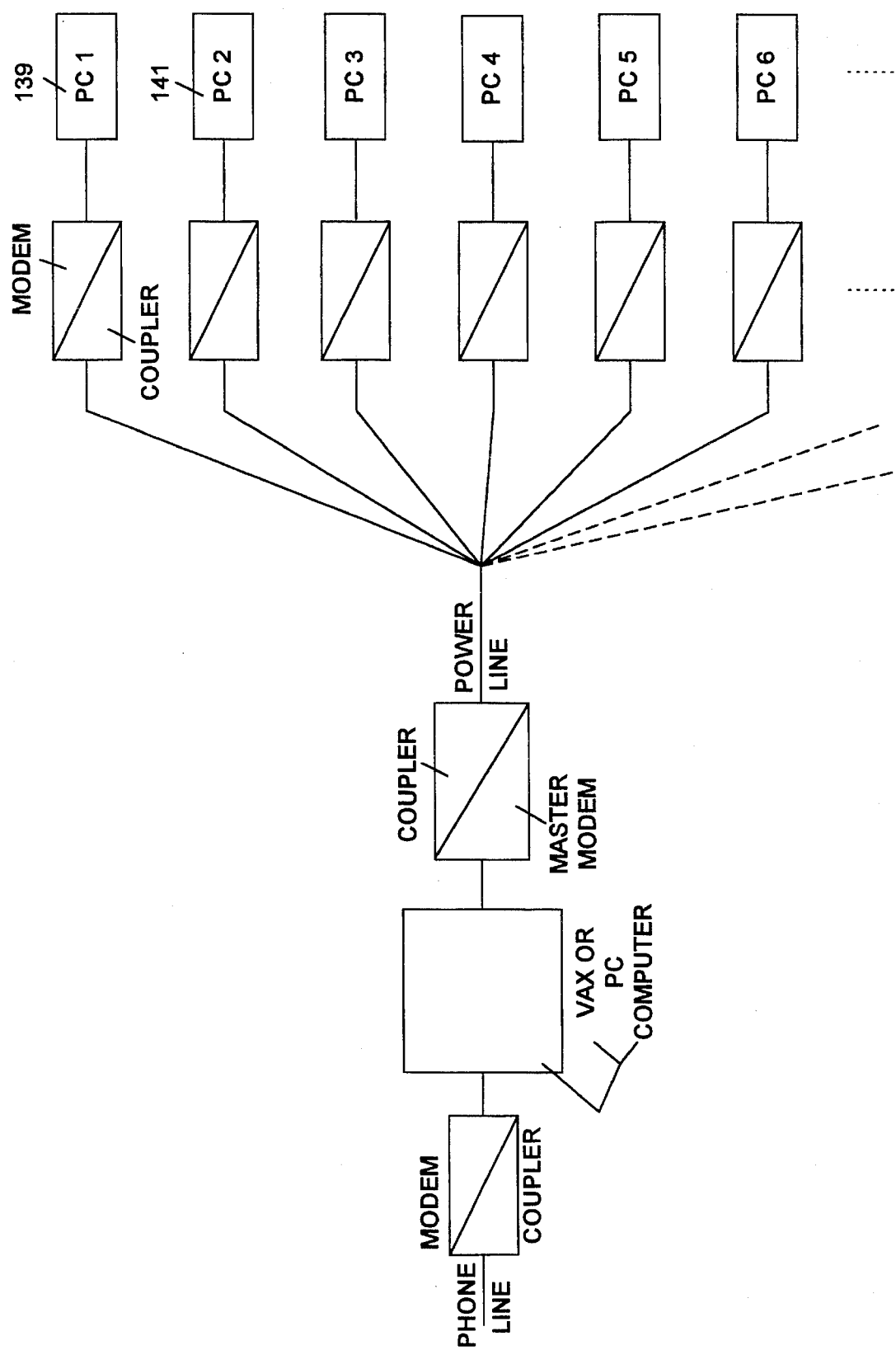
FIG. 22A is a block diagram illustrating the use of the couplers of the present invention within a LAN linked by power lines or conventional phone lines.

From the substation, the meter reading may be transmitted via conventional phone lines 138 to the central computer 139. Additionally, as shown in FIG. 22A, the high speed LAN couplers of the present invention could be used within the utility to connect local workstations to the central computer 139. For example, a clerical worker situated at a work station may access the VAX computer through the power lines of the facility via modems and high speed LAN or phone line couplers of the present invention at data transmission speeds of up to 10 Kbaud.

Figure 23:
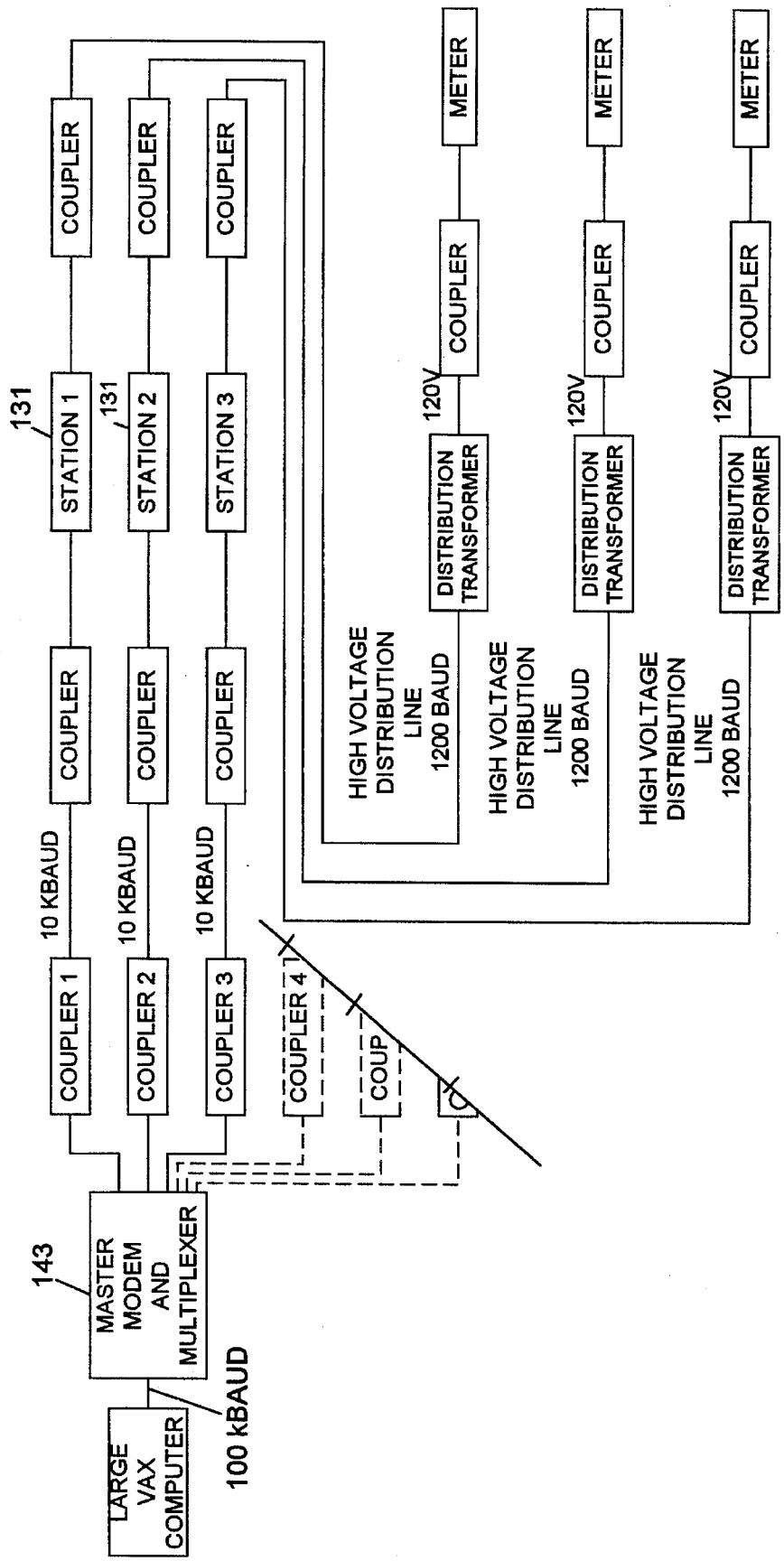
FIG. 23 is a block diagram of the system of FIG. 22 as applied to a multiplicity of substations.

FIG. 23 is a block diagram of an expanded system which may be utilized by a public utility to meter a multiplicity of substations. In this embodiment the central computer would simultaneously read a large number of meters via a master modem and multiplexer coupled to a multiplicity of couplers 143. As shown, the computer communicates with each substation (1, 2, 3, etc.) over conventional phone lines. The respective substations then communicate with the individual meters at 1200 baud via high voltage distribution line and through distribution transformers.

Figure 24:
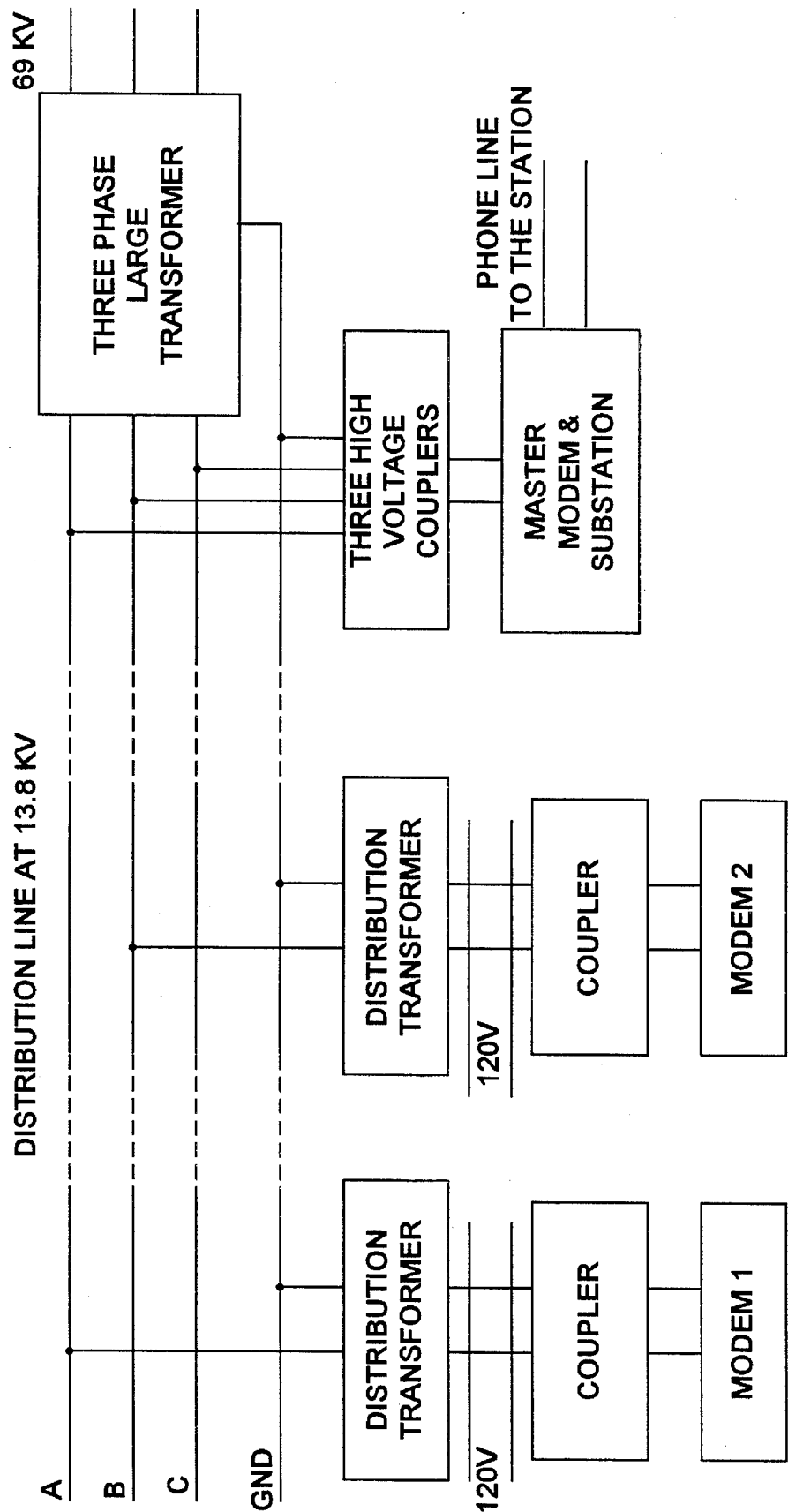
FIG. 24 is a simplified block diagram of the system of FIG. 22.
Figure 25:
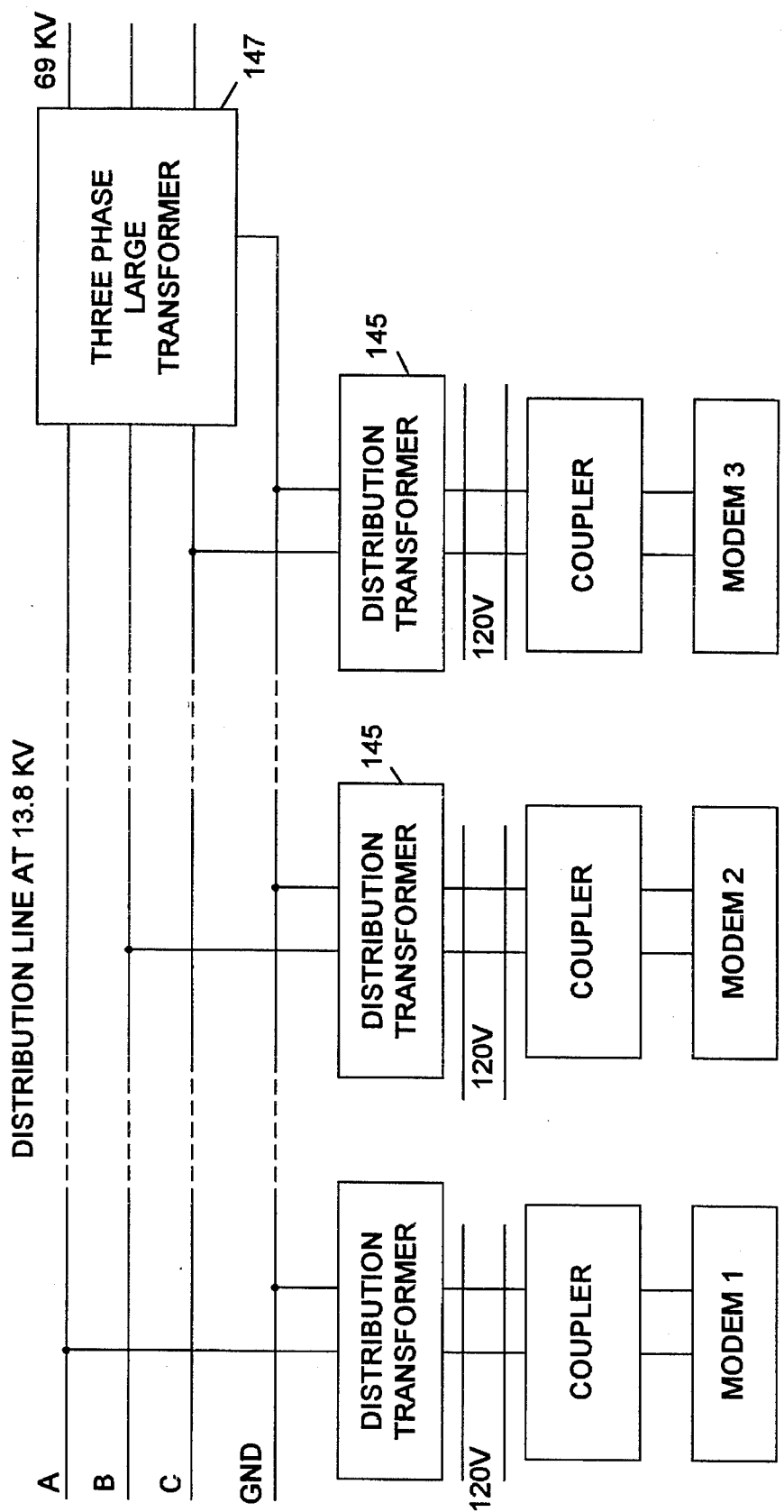
FIG. 25 is a block diagram of a power line communication system.

FIG. 24 is a simplified block diagram of the communication system of FIG. 22. FIG. 25 is a block diagram of how the couplers of the present invention can be utilized to communicate through two power line transformers 145 and through a three phase large transformer 147. In this configuration, the couplers will comprise low voltage couplers designed for communication through power line transformers as discussed above. It is to be noted that the couplers of the present invention will permit the simultaneous transmission and reception of more than one carrier frequency through the couplers. Hence, the couplers can be simultaneously utilized by an electric public utility for electric meter reading at a first frequency while a public water utility utilizes the couplers at a second carrier frequency for water meter reading.

Figure 13:
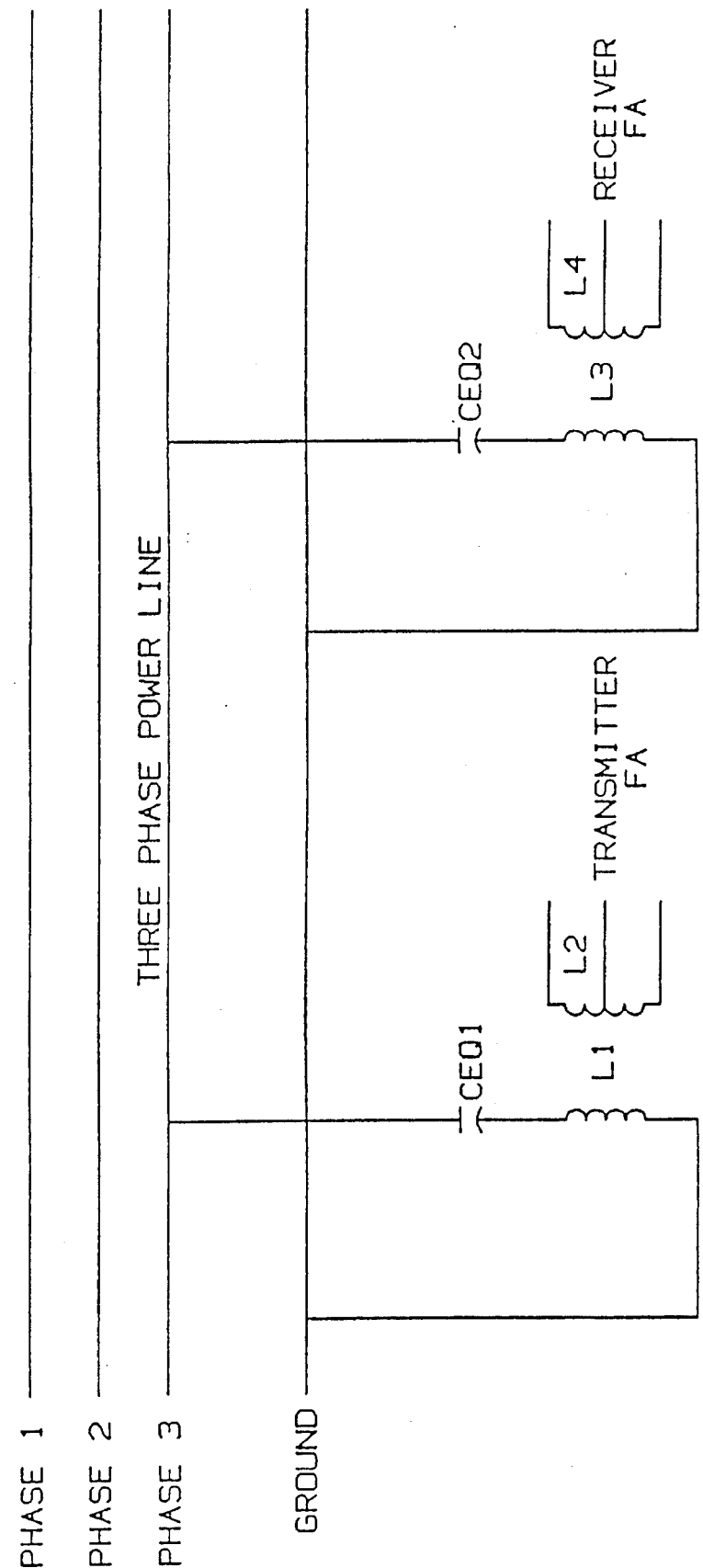
FIG. 13 is a schematic representation of a coupling for the power line from phase to ground.
Figure 14:
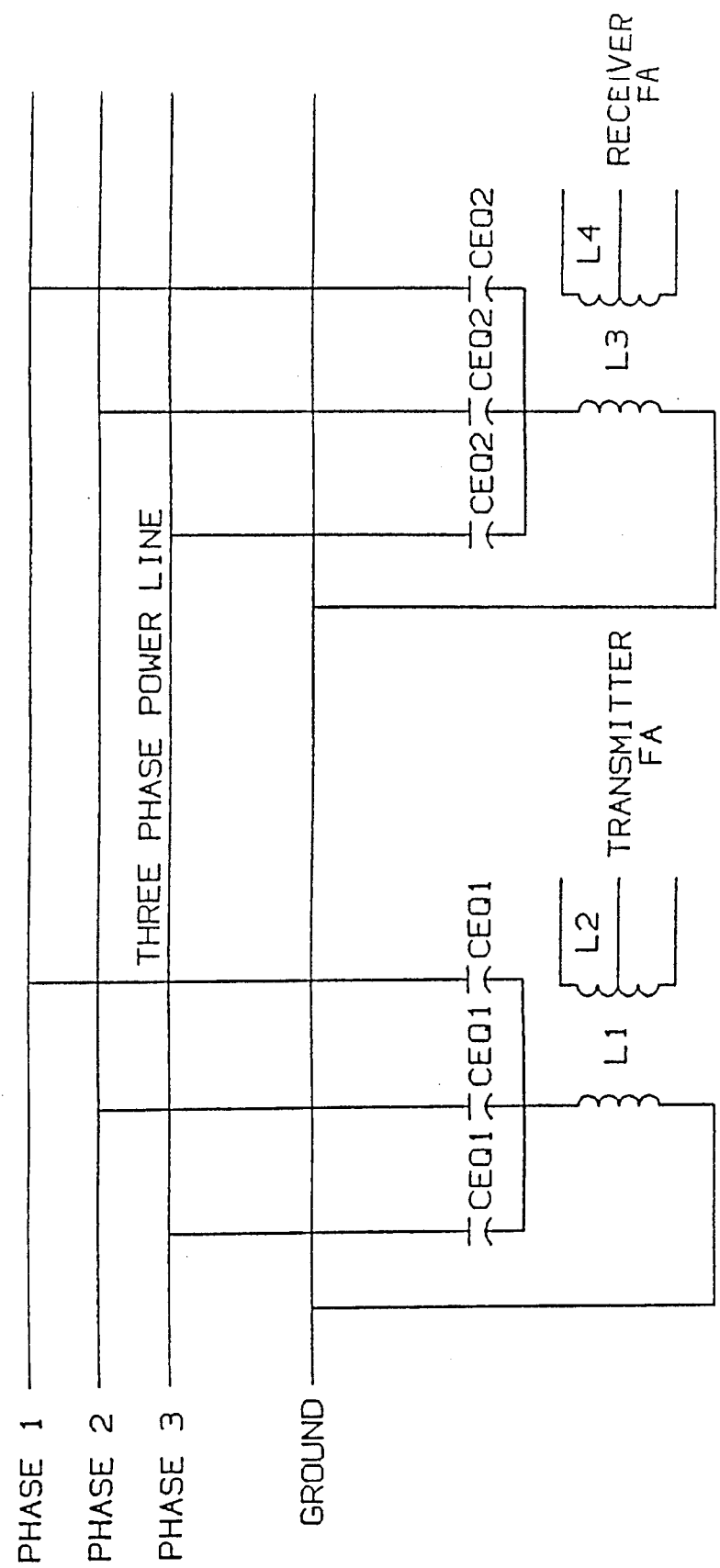
FIG. 14 is a schematic representation of a three phase coupling to the power line, three phases to ground.
Figure 15:
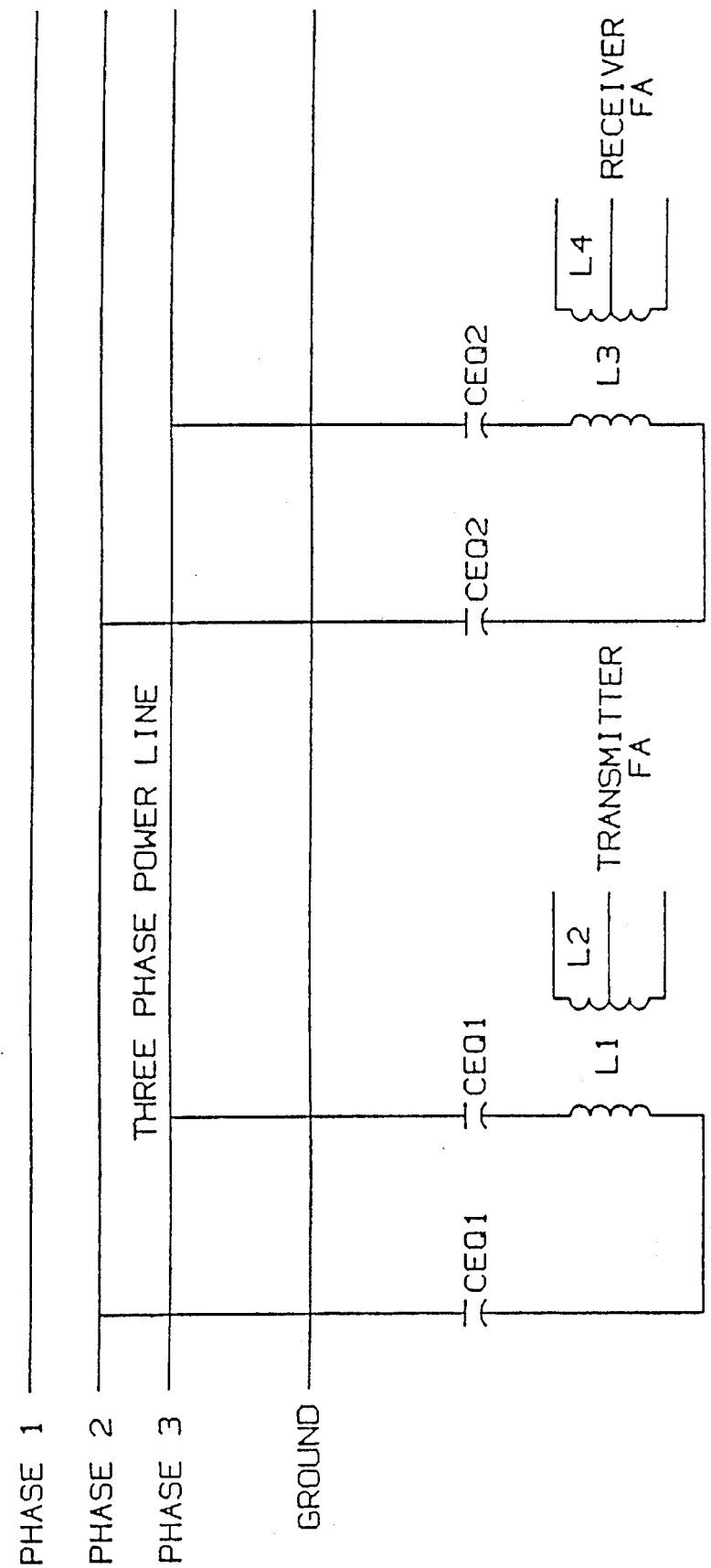
FIG. 15 illustrates a two phase coupling connection to the power line, phase to phase.

A final consideration of the present invention is the connection of the apparatus to a three phase power line. FIG. 13 illustrates the general case of coupling the apparatus to the power line, phase to ground. In this format, the carrier frequency is undetectable by other phase-ground coupling connections and each phase is isolated from each other for communication purposes. FIG. 14 illustrates a special three phase coupling connection to the power line, 3 phases to ground. This system utilizes all three phases from the power line and ground for communication. In this case, the carrier frequency is detectable on any phase-ground coupling connection. In this manner, the phases are interconnected for communicating purposes. FIG. 15 illustrates a special two phase coupling connection to the powerline, phase to phase 147. This system utilizes two phases from the power line for communication. The carrier frequency is detectable only on the two phase coupling connection. In this configuration, only the coupled two phases are connected from communication purposes.

Figure 16:
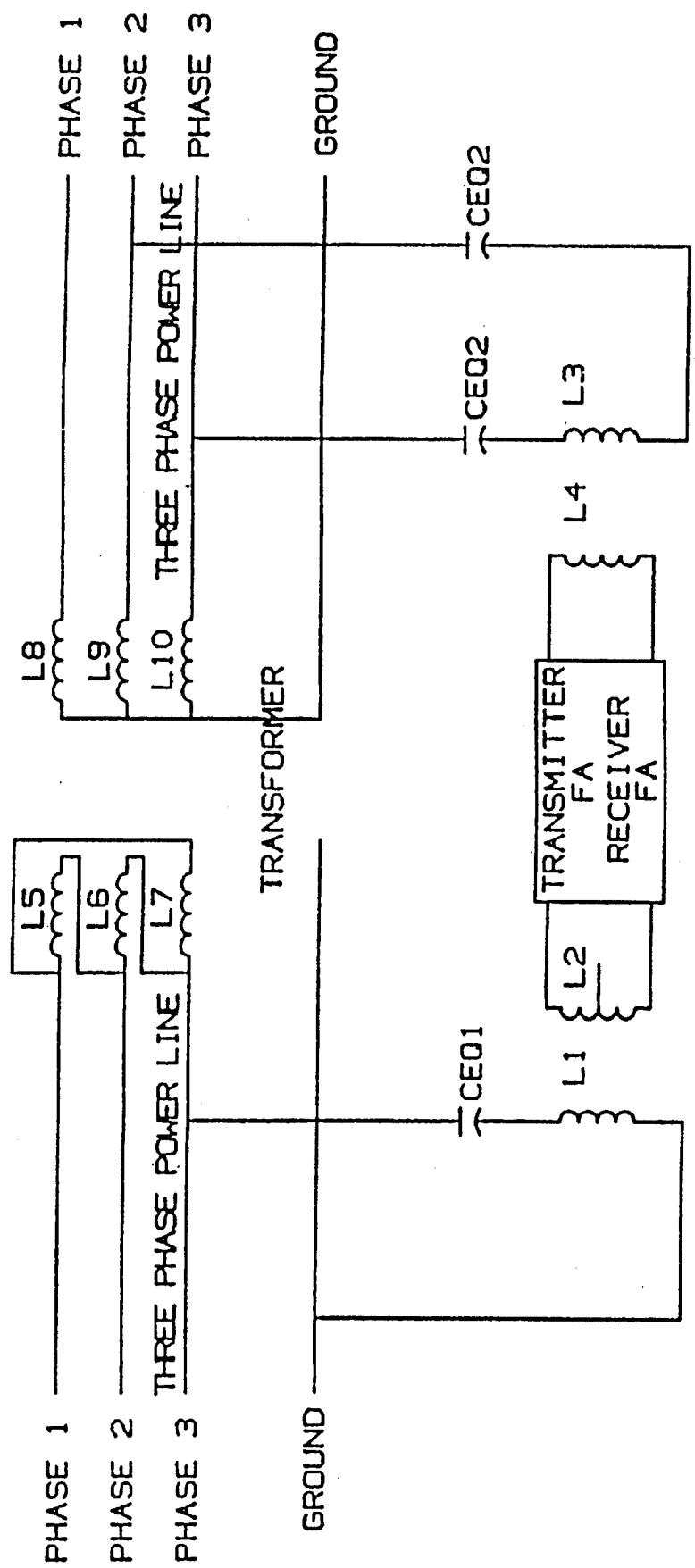
FIG. 16 shows a three phase transformer coupling of the type predominantly used in Europe.
Figure 17:
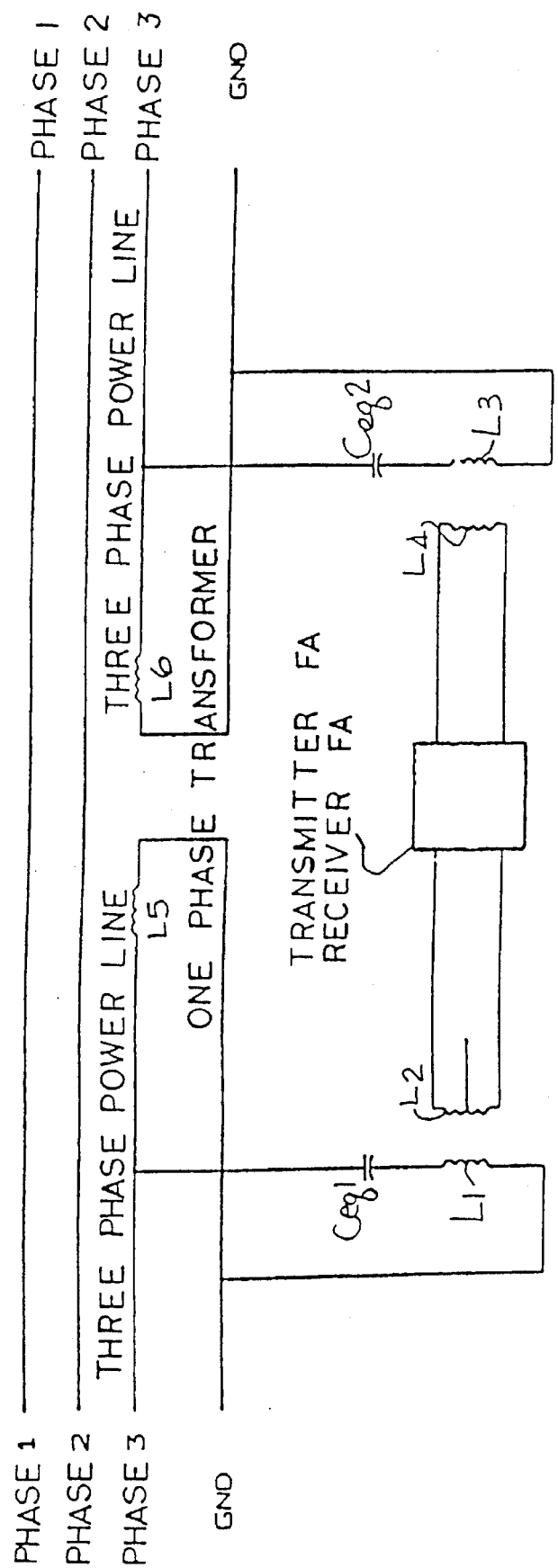
FIG. 17 shows a one phase transformer coupling of the type generally used in the United States.

FIG. 16 illustrates a three phase transformer coupling around delta and Y (Wye) transformers 149. This coupling system is generally utilized in Europe. The carrier frequency is detectable on the other power line. In this manner, two different high voltage power lines are connected to each other for communication purposes. Finally, FIG. 17 illustrates a one phase transformer coupling which is generally used in the U.S.A. In this manner, the carrier frequency is detectable on the other power line. Accordingly, two different high voltage power lines are connected to each other for communication purposes.

It is to be understood, therefore, that within the scope of the appended claims, the present invention may be practiced otherwise than as specifically described herein.

What is claimed is:

1. A communications apparatus for communicating electrical signals through an electrical line having a characteristic impedance comprising:

modulator means for modulating the electrical signals to produce a modulated carrier signal having a first preselected frequency;

transmitter means having an output impedance, connected to said modulator means for transmitting the modulated carrier signal;

first coupler means connected between the electrical line and the transmitter means for matching the output impedance of said transmitter means to the characteristic impedance of the electrical line, said first coupler means comprising linear phase means for communicating the modulated carrier signal to the electrical line without phase distortion and capacitor means for resonating with the linear phase means at the first preselected frequency.

2. The communication apparatus of claim 1 wherein said linear phase means comprises air-core transformer means for communicating said modulated carrier signal without phase distortion, said air-core transformer means comprising primary coil having a first diameter, and secondary coil having a second smaller diameter, said secondary coil extending coaxially within said primary coil such that an air-gap is created between said primary and said secondary coils.

3. The communications apparatus in accordance with claim 2 wherein said primary coil comprises a resistance wire.

4. The communications apparatus of claim 2 wherein said secondary coil comprises a resistance wire.

5. The communications apparatus of claim 2 wherein said primary coil and said secondary coil each comprise a resistance wire.

6. The communications apparatus of claim 3 wherein said resistance wire is comprised of approximately 15% Chromium and 60% Nickel.

7. The communications apparatus of claim 4 wherein said resistance wire is comprised of approximately 15% Chromium and 60% Nickel.

8. The communications apparatus of claim 3 wherein said resistance wire has a specific resistivity of approximately 675 OHM°CIR. MIL. FT.

9. The communications apparatus of claim 4 wherein said resistance wire has a specific resistivity of approximately 675 OHM°CIR. MIL. FT.

10. The communication apparatus of claim 1 wherein said linear phase means comprises dielectric core transformer means for communicating said modulated carrier signal without phase distortion;

said dielectric core transformer means comprising primary coil having a first diameter, and secondary coil having a second smaller diameter, said secondary coil extending coaxially within said primary coil.

* * * * *